US012773739B2

(12) United States Patent
Nagafuchi et al.

(10) Patent No.: US 12,773,739 B2
(45) Date of Patent: Oct. 27, 2026

(54) CUTTING INSERT AND CUTTING-EDGE-REPLACEABLE CUTTING TOOL

(71) Applicant: MOLDINO TOOL ENGINEERING, LTD., Tokyo (JP)

(72) Inventors: Kenji Nagafuchi, Narita (JP); Yoshiyuki Kobayashi, Narita (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 600 days.

(21) Appl. No.: 18/273,287

(22) PCT Filed: Jan. 19, 2022

(86) PCT No.: PCT/JP2022/001809
§ 371 (c)(1),
(2) Date: Jul. 20, 2023

(87) PCT Pub. No.: WO2022/181123
PCT Pub. Date: Sep. 1, 2022

(65) Prior Publication Data

US 2024/0100610 A1 Mar. 28, 2024

(30) Foreign Application Priority Data

Feb. 26, 2021 (JP) ................................ 2021-030531

(51) Int. Cl.
*B23C 5/20* (2006.01)
*B23C 5/10* (2006.01)

(52) U.S. Cl.
CPC .............. *B23C 5/20* (2013.01); *B23C 5/1045* (2013.01); *B23C 5/202* (2013.01); *B23C 2200/0472* (2013.01)

(58) Field of Classification Search
CPC ................ B23B 2200/203; B23C 5/20; B23C 2200/0472; B23C 2200/0416;
(Continued)

(56) References Cited

U.S. PATENT DOCUMENTS 5,951,213 A 9/1999 Fauser et al.
7,815,402 B2 * 10/2010 Yoshida ................ B23C 5/2213 407/115

(Continued)

FOREIGN PATENT DOCUMENTS

CN 1459349 A 12/2003
CN 1761546 A 4/2006

(Continued)

OTHER PUBLICATIONS

Notice of Allowance mailed Jan. 7, 2025, issued for JP2023-502164 and English translation thereof.

(Continued)

*Primary Examiner* — Sarang Afzali
*Assistant Examiner* — Darrell C Ford
(74) *Attorney, Agent, or Firm* — Troutman Pepper Locke LLP; James E. Armstrong, IV; Joshua L. Jones

(57) ABSTRACT

In this cutting insert, two cutting edges respectively including arc-shaped cutting edge parts extending in an arc shape in a plan view and linear cutting edge parts are provided in an intersection ridge line part between a rake face and a flank face. The cutting edges include a convex curved part moving away from a seating face and then moving close to the seating face as at least the arc-shaped cutting edge part moves away from the linear cutting edge parts. In a side view, the arc-shaped cutting edge parts include curvature change points between most protruding points farthest from the seating face and cutting edge tips of the arc-shaped cutting edge parts.

11 Claims, 14 Drawing Sheets

(58) Field of Classification Search
CPC ........ B23C 2200/165; B23C 2200/203; B23C 5/202; B23C 5/2213; B23C 5/1045; B23C 5/205; B23C 2200/125
See application file for complete search history.

(56) References Cited

U.S. PATENT DOCUMENTS

| | | | | |
|---|---|---|---|---|
| 8,454,279 | B2 * | 6/2013 | Dufour | B23C 5/202 407/115 |
| 11,344,958 | B2 * | 5/2022 | Komatsu | B23C 5/109 |
| 2002/0159846 | A1 * | 10/2002 | Horiike | B23C 5/1045 407/115 |
| 2006/0275088 | A1 * | 12/2006 | Lehto | B23C 5/2213 407/113 |
| 2010/0003090 | A1 * | 1/2010 | Johansson | B23C 5/202 407/113 |
| 2017/0008099 | A1 | 1/2017 | Touma | |

FOREIGN PATENT DOCUMENTS

| | | | |
|---|---|---|---|
| CN | 101616766 | A | 12/2009 |
| CN | 201871750 | U | 6/2011 |
| JP | H110-071521 | A | 3/1998 |
| JP | H11-070404 | A | 3/1999 |
| JP | H11-156625 | A | 6/1999 |
| JP | H11-197933 | A | 7/1999 |
| JP | 2005-131788 | A | 5/2005 |
| JP | 2012-157911 | A | 8/2012 |
| JP | 6540928 | B1 | 7/2019 |
| WO | 2015/115379 | A1 | 8/2015 |
| WO | 2019/082843 | A1 | 5/2019 |
| WO | 2020/039981 | A1 | 2/2020 |

OTHER PUBLICATIONS

International Search Report mailed Jan. 30, 2025, issued for EP22759166.6.
Notice of Allowance mailed Dec. 17, 2025, issued for CN202280016667.3 and English translation thereof.
International Search Report mailed Mar. 22, 2022, issued for PCT/JP2022/001809 and English translation thereof.
Office Action mailed Jul. 31, 2025, issued for CN202280016667.3 and English translation thereof.
European Search Report mailed Jan. 30, 2025, issued for EP22759166.6.

* cited by examiner

CUTTING INSERT AND CUTTING-EDGE-REPLACEABLE CUTTING TOOL

TECHNICAL FIELD

The present invention relates to a cutting insert and a cutting-edge-replaceable cutting tool.

Priority is claimed on Japanese Patent Application No. 2021-030531, filed Feb. 26, 2021, the content of which is incorporated herein by reference.

BACKGROUND ART

As a cutting insert attached to a cutting-edge-replaceable cutting tool, for example, Patent Document 1 discloses a cutting insert including a rake face which faces a rotation direction of a tool body, a seating face which is seated on a bottom face of an insert attachment seat toward the side opposite to the rake face, and a flank face which extends around the rake face and the seating face. Two cutting edges each including an arc-shaped cutting edge part extending in an arc shape in a plan view when viewed from a direction facing the rake face and a linear cutting edge part extending to be in contact with the arc-shaped cutting edge part are formed at an intersection ridge line part between the rake face and the flank face so that the arc-shaped cutting edge part and the linear cutting edge part are located alternately in a circumferential direction of the rake face. Further, the arc-shaped cutting edge part of a major cutting edge or the arc-shaped cutting edge part of a minor cutting edge is formed in a convex curved shape moving away from the seating face side and moving close to the seating face side again as it moves away from the linear cutting edge part. Accordingly, Patent Document 1 describes that cutting resistance can be reduced since the arc-shaped cutting edge part gradually bits and cuts the work material from the most protruding point protruding most with respect to the seating face during cutting.

CITATION LIST

Patent Document

[Patent Document 1] Japanese Patent No. 6540928

SUMMARY OF INVENTION

Technical Problem

However, if the cutting insert described in Patent Document 1 is cut with a cutting depth that does not match a most protruding point design position, there is a problem that the cutting insert tends to have a short life due to insufficient strength of the cutting edge. Patent Document 1 describes that the position of the most protruding point can be set to a wide range on the arc-shaped cutting edge using a first intersection angle or a second intersection angle, but in practice, it is necessary to select whether or not the most protruding point is provided at a position corresponding to machining with a large cutting depth or a position corresponding to machining with a small cutting depth.

For example, if the cutting insert is used for machining with a small cutting depth when the most protruding point is provided at a position corresponding to machining with a large cutting depth, the life is shortened due to chipping caused by the stress concentration on the tip part of the cutting insert.

On the other hand, when the most protruding point is provided at a position corresponding to machining with a small cutting depth in a material having high hardness or a material not easily cut, the cutting insert undergoes damage (crack) due to stress concentration even when the cutting depth exceeds the most protruding point in machining with varying cutting depth and hence the life is shortened.

For example, the cutting depth varies depending on the machining position when using a ball end mill to machine a complex mold shape. It is not realistic to partially apply a cutting tool according to the cutting depth.

Further, the cutting depth varies even when machining an overlay welding material, but even in that case, it is not realistic to replace the tool according to the cutting depth. Since the overlay welding material is used for the purpose of repairing molds and ensuring partial strength and unevenness of a machined face occurs at each machined position as described above, the cutting depth varies often due to these unevenness.

The present invention has been made in view of such circumstances and an object thereof is to provide a cutting insert and a cutting-edge-replaceable cutting tool capable of suppressing the occurrence of cracks on a cutting edge part by dispersing stress during cutting at a wider cutting depth than before and increasing strength on a cutting edge tip side.

Solution to Problem

A cutting insert of an aspect of the present invention is a cutting insert detachably attached to an insert attachment seat formed at a tip of a tool body in a cutting-edge-replaceable cutting tool rotating around an axis, including: a rake face which faces a rotation direction of the tool body; a seating face which is seated on a bottom face of the insert attachment seat to face the side opposite to the rake face; and a flank face which extends around the rake face and the seating face. Two cutting edges each including an arc-shaped cutting edge part extending in an arc shape in a plan view when viewed from a direction facing the rake face and a linear cutting edge part extending to be in contact with the arc-shaped cutting edge part are formed at an intersection ridge line part between the rake face and the flank face so that the arc-shaped cutting edge part and the linear cutting edge part are located alternately in a circumferential direction of the rake face. The cutting edges include a convex curved part moving away from the seating face and then moving close to the seating face as at least the arc-shaped cutting edge part moves away from the linear cutting edge part. In a side view when viewed from a direction facing the flank face, the arc-shaped cutting edge part includes a curvature change point between a cutting edge tip of the arc-shaped cutting edge part and the most protruding point when the most protruding point indicates a point farthest from the seating face on the convex curved part.

According to this configuration, since the arc-shaped cutting edge part includes the curvature change point between the cutting edge tip of the arc-shaped cutting edge part and the most protruding point farthest from the seating face on the convex curved part in a side view when viewed from a direction facing the flank face of the cutting edge, the arc-shaped cutting edge part has a shape in which the curvature is different with the curvature change point as a boundary and hence stress during cutting is dispersed in a wide range of the arc-shaped cutting edge part during cutting at a cutting depth wider than before. Accordingly, since it is possible to avoid the occurrence of chipping or damage (crack) of the cutting insert, it is possible to increase the strength of the entire arc-shaped cutting edge part and to suppress the occurrence of cracks on the cutting edge part. Further, since the cutting edge shape is smoothed at the initial stage when the cutting insert bites into the work material by providing the curvature change point between the most protruding point and the cutting edge tip, the twist of the chip shape decreases. Therefore, it is possible to prevent twisted chips from applying an irregular force to the cutting insert and the work material.

In the cutting insert according to an aspect of the present invention, in the side view when viewed from a normal direction with respect to a tangent line of the arc-shaped cutting edge part passing through the most protruding point, each of the cutting edges may include arcs having at least two different curvatures, and when an arc radius on the cutting edge tip side is R1 and an arc radius on the most protruding point side is R2, a relationship of R1<R2 may be satisfied.

According to this configuration, since a shape is formed in which the arc radius R1 on the cutting edge tip side is smaller than the arc radius R2 on the most protruding point side in the arc radii R1 and R2 of two different curvatures constituting a part of the cutting edge and the curve of the arc on the cutting edge tip side is steep, the cutting edge smoothly contacts the work material and the impact acting on the cutting edge decreases. As a result, it is possible to obtain an effect of dispersing stress and reducing cutting resistance.

Additionally, according to this configuration, the arcs having two different curvatures may be included in the cutting edge from the cutting edge tip side to the most protruding point side and for example, the arcs having two different curvatures or the arc on the most protruding point side and the most protruding point may be connected by a curve or line. Further, in the arcs having two different curvatures, the arc on the most protruding point side and the most protruding point may be connected by a curve or line. In such a case, the line may not be the tangent line of the arc. On the other hand, since the present invention has a shape that relieves the impact acting on the cutting edge during machining in which the arc-shaped cutting edge part gradually contacts the work material during cutting, the line is formed in parallel to the seating face or formed to be away from the seating face as it moves from the cutting edge tip toward the most protruding point. Similarly, the curve is formed to be away from the seating face as it moves from the cutting edge tip toward the most protruding point.

In the cutting insert according to an aspect of the present invention, the arc radius R1 may be formed in a size of ½ or less of the arc radius R2 and may be preferably ⅓ or less and more preferably ¼ or less.

According to this configuration, since the arc radius R1 is formed in a size of ½ or less of at least the arc radius R2, the arc-shaped cutting edge on the cutting edge tip side forms a steep curve and the impact on the cutting edge can be sufficiently decreased. Furthermore, since the arc radius R1 is ⅓ or ¼ or less of the arc radius R2, the curve becomes steeper and the impact on the cutting edge tip is relieved. The lower limit of R1/R2 is not limited, but is realistically about 1/100.

In the cutting insert according to an aspect of the present invention, in the side view, the cutting edge may be formed by a first cutting edge having a curved shape in which the cutting edge tip side protrudes upward with respect to the seating face and a second cutting edge having a shape in which the most protruding point side protrudes upward with respect to the seating face with the curvature change point as a boundary, the second cutting edge may be formed as a second cutting edge having a curved or linear shape with a curvature smaller than that of the first cutting edge, and an intersection between the first cutting edge and the second cutting edge may be the curvature change point.

According to this configuration, since a curve shape is formed in which the first cutting edge located on the cutting edge tip side is steeper than the second cutting edge located on the most protruding point side with the curvature change point as an intersection point between two first and second cutting edges having different curvatures as a boundary, the cutting edge smoothly contacts the work material and the impact acting on the cutting edge decreases. As a result, it is possible to obtain an effect of dispersing stress and reducing cutting resistance.

Additionally, the linear curvature is "0". Thus, since the curvature of the second cutting edge becomes smaller than the curvature of the first cutting edge even when the second cutting edge is linear, it is possible to obtain the same effect as when the second cutting edge is formed as a curve having a curvature smaller than that of the first cutting edge.

In the cutting insert according to an aspect of the present invention, the curvature of the first cutting edge may be twice or more the curvature of the second cutting edge and may be preferably three times or more and more preferably four times or more.

According to this configuration, when the curvature of the second cutting edge is twice or more the curvature of the first cutting edge, the impact acting on the cutting edge sufficiently decreases. On the other hand, when the curvature of the second cutting edge is less than twice the curvature of the first cutting edge, the curvature of the first cutting edge is not large enough and the stress becomes easily to concentrate on the cutting edge during cutting.

In the cutting insert according to an aspect of the present invention, the second cutting edge may be a part in which a ratio of a height from the cutting edge tip to an arbitrary cutting edge ridge line with respect to a height from the cutting edge tip to the most protruding point in a direction perpendicular to the seating face at the arc-shaped cutting edge part in the side view is 90% or more.

According to this configuration, since a curve shape is formed in which the height from the cutting edge tip to the curvature change point with respect to the height from the curvature change point to the most protruding point is 90% or more and the cutting edge tip side is steeper than the most protruding point side with the curvature change point as a boundary in a direction perpendicular to the seating face, the cutting edge smoothly contacts the work material and the impact acting on the cutting edge can be decreased. Although the upper limit of the height from the cutting edge tip to the curvature change point with respect to the height from the curvature change point to the most protruding point is not limited, the upper limit is realistically about 98%.

In the cutting insert according to an aspect of the present invention, the cutting insert may be provided with a groove part having a wall face capable of abutting against a convex part protruding from the bottom face of the insert attachment seat, two groove parts may be formed with an attachment hole for attaching the cutting insert in a sandwiched state, and the curvature change point may be formed on the cutting edge tip side in relation to one groove part close to the arc-shaped cutting edge part in the two groove parts.

According to this configuration, since the curvature change point is formed on the cutting edge tip side in relation to one groove part close to the arc-shaped cutting edge part, it is possible to ensure the thickness at the curvature change point and to increase the strength of the cutting edge.

In the cutting insert according to an aspect of the present invention, the arc-shaped cutting edge part may be composed of a first cutting edge and a second cutting edge to an N-th cutting edge (N is an integer of 2 or more) each having an arc shape and having at least two or more different arc radii in order from a position corresponding to a tool tip side, the first cutting edge on the tip side may have an arc radius smaller than those of the second cutting edge to the N-th cutting edge, and in the first cutting edge, a cutting edge angle which is an angle formed by the flank face and the rake face may gradually decrease from the second cutting edge side toward the tool tip side. According to this configuration, since the cutting edge angle of the cutting edge part gradually decreases from the rear end toward the tip of the first cutting edge of the arc-shaped cutting edge part, it is possible to increase the flank angle of the cutting edge during cutting with the cutting edge tip part and to suppress the progress of the wear of the flank face of the cutting edge tip part.

Generally, in this kind of tool, since the tip part of the arc-shaped cutting edge part receives an upward pushing force in the Z-axis direction during cutting, there is a high risk of chipping. Further, in general, the thickness increases as the cutting edge angle of the cutting edge increases to increase the strength of the cutting edge, but if the flank angle is small when cutting a work material such as high-hardness steel, the life of the cutting edge may vary even if the thickness is large. On the other hand, in the above aspect, the life of the tip part of the arc-shaped cutting edge part can be stabilized by gradually increasing the flank angle of the cutting edge tip part from the rear end side to the tip side of the first cutting edge and ensuring a certain flank angle at the tip part of the arc-shaped cutting edge part during cutting.

In the cutting-edge-replaceable cutting tool according to an aspect of the present invention, when a center point of the arc-shaped cutting edge part on the axis is defined as P, an angle formed by the axis and a line connecting the center point and the most protruding point is $\theta 1$, and an angle formed by the axis and a line connecting the center point and the curvature change point is $\theta 2$, $\theta 2<\theta 1$, $30° \leq \theta 1 \leq 50°$, and $15° \leq \theta 2 \leq 40°$ may be satisfied and $40° \leq \theta 1 \leq 50°$ and $17° \leq \theta 2 \leq 37°$ may be preferably satisfied.

According to this configuration, since the curvature change point is formed on the cutting edge tip side in relation to the most protruding point and the cutting stress can be dispersed in a wide range of the cutting edge, it is possible to avoid the occurrence of chipping or damage (crack) due to stress concentration. Accordingly, it is possible to increase the strength on the cutting edge tip side and to suppress the occurrence of cracks on the cutting edge part. Further, it is also possible to obtain an effect of reducing resistance during cutting.

In the cutting-edge-replaceable cutting tool according to an aspect of the present invention, when a distance from the cutting edge tip of the cutting edge of the cutting insert to the curvature change point is H in a direction along the axis and a diameter of the tool body is D, a relationship of $D/30 \leq H \leq D/10$ may be satisfied.

According to this configuration, it is possible to obtain an effect of avoiding the stress concentration of the cutting edge and reliving the impact on the cutting edge tip during cutting regardless of the cutting depth varying according to the tool diameter.

Further, in the cutting-edge-replaceable cutting tool according to an aspect of the present invention, the arc-shaped cutting edge part may be composed of a first cutting edge and a second cutting edge to an N-th cutting edge (N is an integer of 2 or more) each having an arc shape and having at least two or more different arc radii in order from a position corresponding to a tool tip side, the first cutting edge on the tip side may have an arc radius smaller than those of the second cutting edge to the N-th cutting edge, and in the first cutting edge, a flank angle which is an angle formed by a work material face and the flank face of the cutting insert may gradually increase from the second cutting edge side toward the tool tip side.

According to this configuration, since the flank angle of the cutting insert gradually increases from the second cutting edge side toward the tool tip side in the first cutting edge of the arc-shaped cutting edge part, it is possible to relatively increase the flank angle of the cutting edge during cutting with the cutting edge tip part and to suppress the progress of the wear of the flank face of the cutting edge tip part.

Further, since the flank angle of the first cutting edge of the cutting insert gradually increases from the second cutting edge side toward the tool tip side, it is possible to ensure a certain flank angle during cutting and to stabilize the life of the tip part of the arc-shaped cutting edge part.

In the cutting-edge-replaceable cutting tool according to an aspect of the present invention, when a difference between the lowest points of any one cutting insert and the other cutting insert is H while a plurality of the cutting inserts are attached to the tool body, a relationship with the diameter D of the tool body may be set such that H/D is 0.025 or less.

In this configuration, since H/D is 0.025 or less, the cutting edge step of the cutting insert with respect to the tool diameter D can be sufficiently decreased. As a result, the cutting range with only the cutting insert (the cutting insert 1A, that is, a parent cutting edge in the embodiment to be described later) having the lower lowest point decreases, the wear of the tip part of the cutting insert (parent cutting edge) having the lower lowest point is suppressed, and the life of the cutting insert can be extended. H/D is preferably 0.020 or less and more preferably 0.017 or less. The lower limit of H/D is not limited, but is realistically about 0.010.

In the cutting-edge-replaceable cutting tool according to an aspect of the present invention, two insert attachment seats may be formed at positions separated from each other by 180° at a tip part of the tool body, and the cutting insert may be detachably attached to each of these two insert attachment seats. However, in the present invention, three insert attachment seats may be formed to be away from each other by 120° at the tip part of the tool body. Similarly, four or more insert attachment seat may be formed at equal intervals in the circumferential direction.

Advantageous Effects of Invention

According to the present invention, it is possible to provide the cutting insert and the cutting-edge-replaceable cutting tool capable of suppressing the occurrence of cracks on the cutting edge part by dispersing the stress generated in the arc-shaped cutting edge part.

DESCRIPTION OF EMBODIMENTS

Hereinafter, a configuration of a cutting insert and a cutting-edge-replaceable cutting tool of an embodiment of the present invention will be described with reference to FIGS. 1 to 11B.

Figure 1:
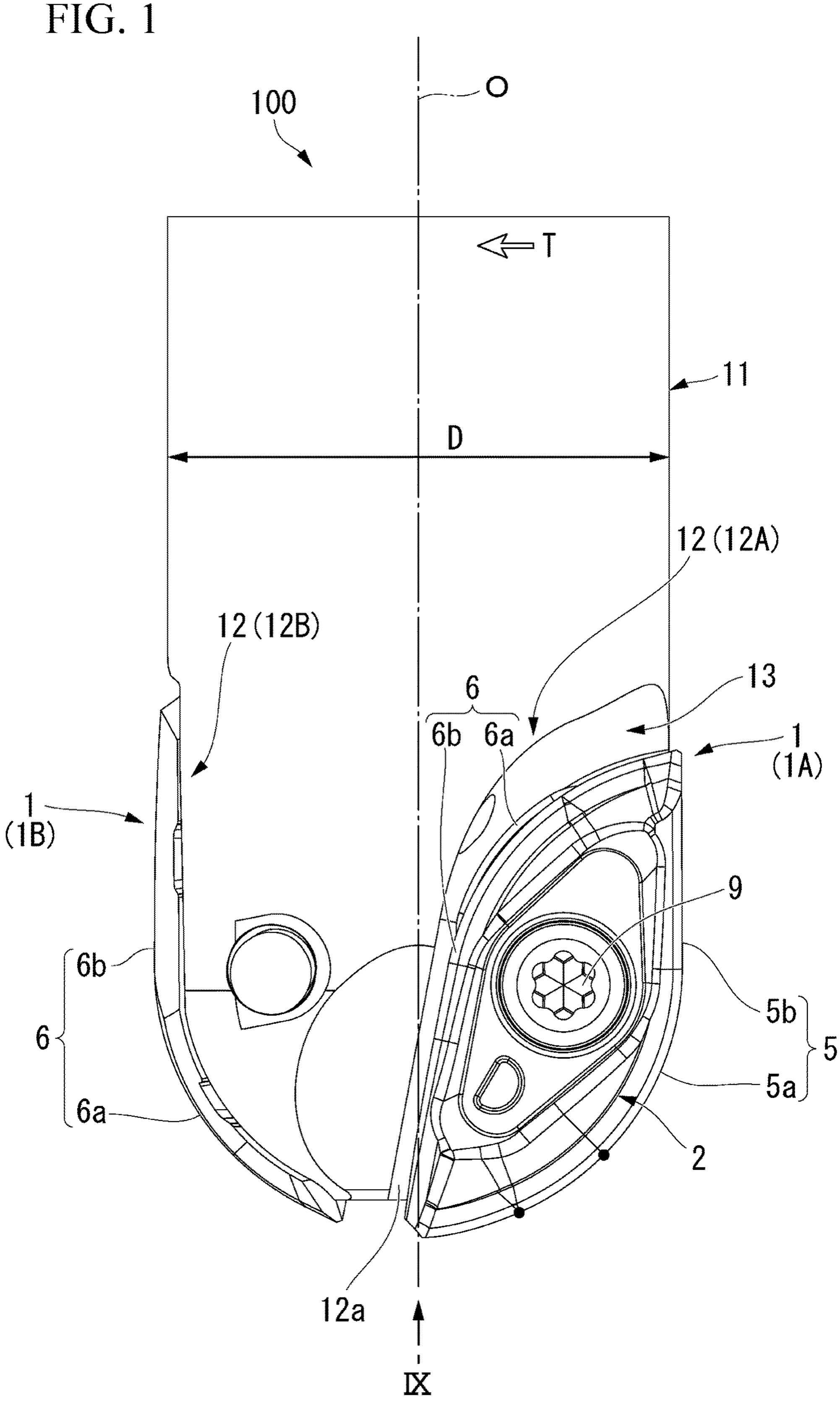
FIG. 1 is a view showing a tip side of an embodiment of a cutting-edge-replaceable ball end mill of the present invention (when viewed in a direction of an arrow I in FIG. 9) and is a view showing a configuration in which a plurality of cutting inserts of an embodiment of the present invention are detachably attached to a tool body.
Figure 9:
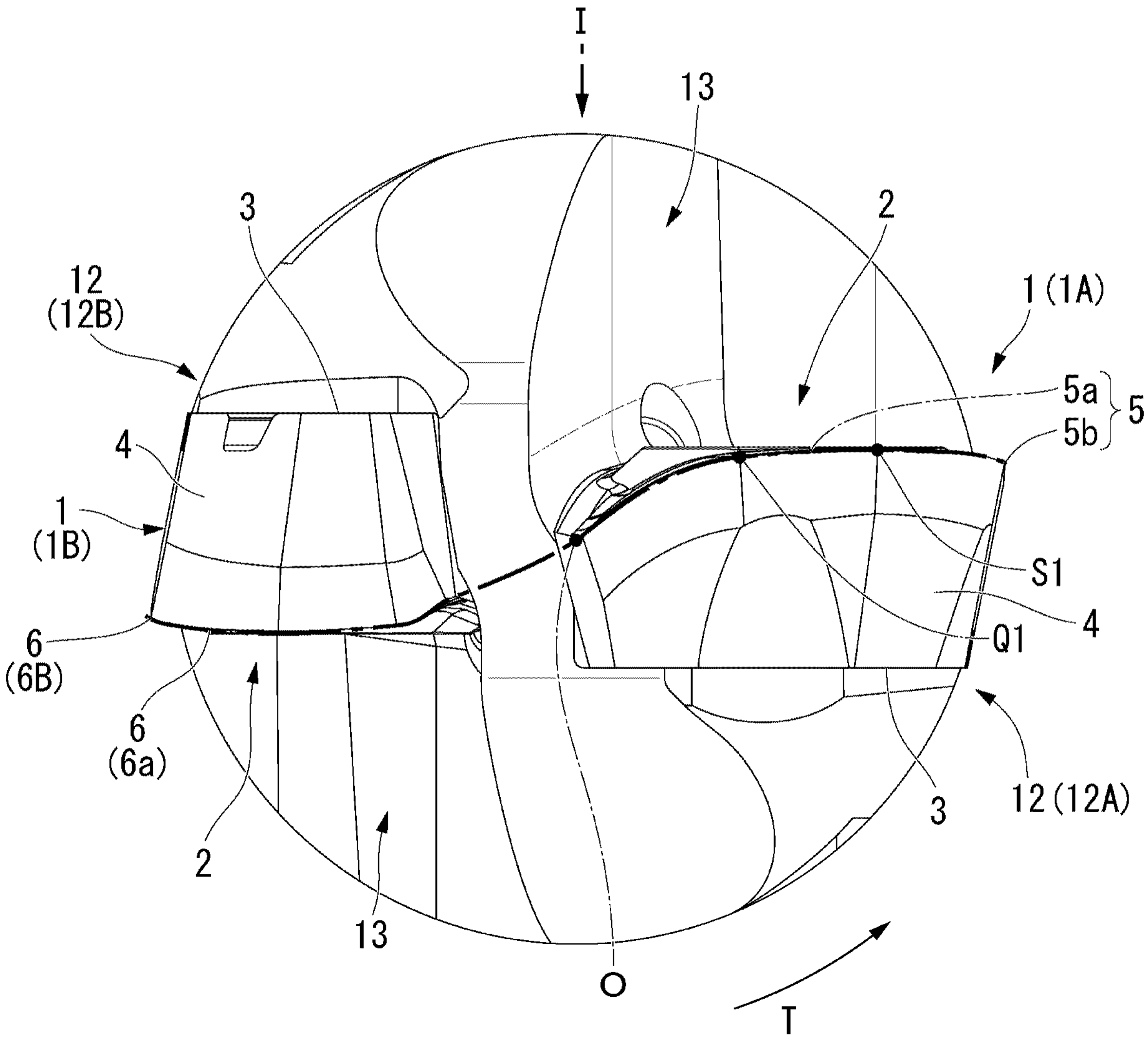
FIG. 9 is a front view of the cutting-edge-replaceable ball end mill of an embodiment of the present invention.

FIG. 1 is a view showing a tip side of an embodiment of a cutting-edge-replaceable ball end mill of the present invention (when viewed in a direction of an arrow I in FIG. 9) and is a view showing a configuration in which a plurality of (in this embodiment, two) cutting inserts 1 of an embodiment of the present invention are detachably attached to a tool body 11. FIG. 9 is a front view of the cutting-edge-replaceable ball end mill of an embodiment of the present invention.

<Cutting-Edge-Replaceable Cutting Tool>

As shown in FIGS. 1 and 9, a cutting-edge-replaceable ball end mill (cutting-edge-replaceable cutting tool) 100 of an embodiment of the present invention includes the plurality of cutting inserts 1 and the tool body 11 which holds these cutting inserts 1. The tool body 11 is rotated around an axis O.

Each of the plurality of cutting inserts 1 is detachably attached to a plurality of (in this embodiment, two) insert attachment seats 12 formed at the tip side of the tool body 11. In this embodiment, two cutting inserts 1 (1A and 1B) are attached to two insert attachment seats 12 (12A and 12B) provided in the end mill body. These two cutting inserts 1 (1A and 1B) have the same shape and size. In the present invention, the number of the cutting inserts 1 and the insert attachment seats 12 is not limited to two and three or more insert attachment seats 12 may be provided at equal circumferential intervals around the axis O. In this embodiment, the cutting insert 1A is located lower than the cutting insert 1B and in this case, the cutting insert 1A is called a parent cutting edge and the cutting insert 1B is called a child cutting edge.

(End Mill Body)

The tool body 11 is formed of a metal material such as steel and is formed such that the rear end side has a columnar chunk centered on the axis O and the tip side has a convex hemispherical shape centered on the axis O.

In the cutting-edge-replaceable ball end mill 100 of this embodiment, the cutting insert 1 attached to the insert attachment seat 12 cuts a work material in such a manner that the tool body 11 is sent out in a direction intersecting the axis O while being rotated about the axis O in the rotation direction of the tool body 11.

Additionally, in this embodiment, a direction from the shank part of the tool body 11 to the insert attachment seat 12 is called the tip side (the lower end side in FIG. 1) and a direction from the insert attachment seat 12 to the shank part is called the rear end side (the upper end side in FIG. 1) in the extension direction of the axis O. Further, a direction orthogonal to the axis O is called a radial direction. In the radial direction, a direction moving close to the axis O is called the inner peripheral side and a direction moving away from the axis O is called the outer peripheral side.

In this embodiment, two chip pockets 13 are formed to cut the outer periphery of the tip part of the tool body 11 and the insert attachment seats 12 are respectively formed on bottom faces 12*a* of these two chip pockets 13 facing the end mill rotation direction T on the opposite sides with a circumferential gap therebetween.

In this embodiment, two cutting inserts 1 (1A and 1B) having the same shape and size are detachably attached to two insert attachment seats 12 (12A and 12B) of the tool body 11. By attaching two cutting inserts 1 (1A and 1B) of one type to the tool body 11, it is possible to perform cutting from the vicinity of the axis O of the tip of the tool body 11 to the outer periphery and cutting from a position away from the axis O to the outer periphery. Accordingly, it is possible to easily manage the cutting insert 1 and to manufacture the cutting insert 1 (1A and 1B) by only one type of mold.

Figure 10:
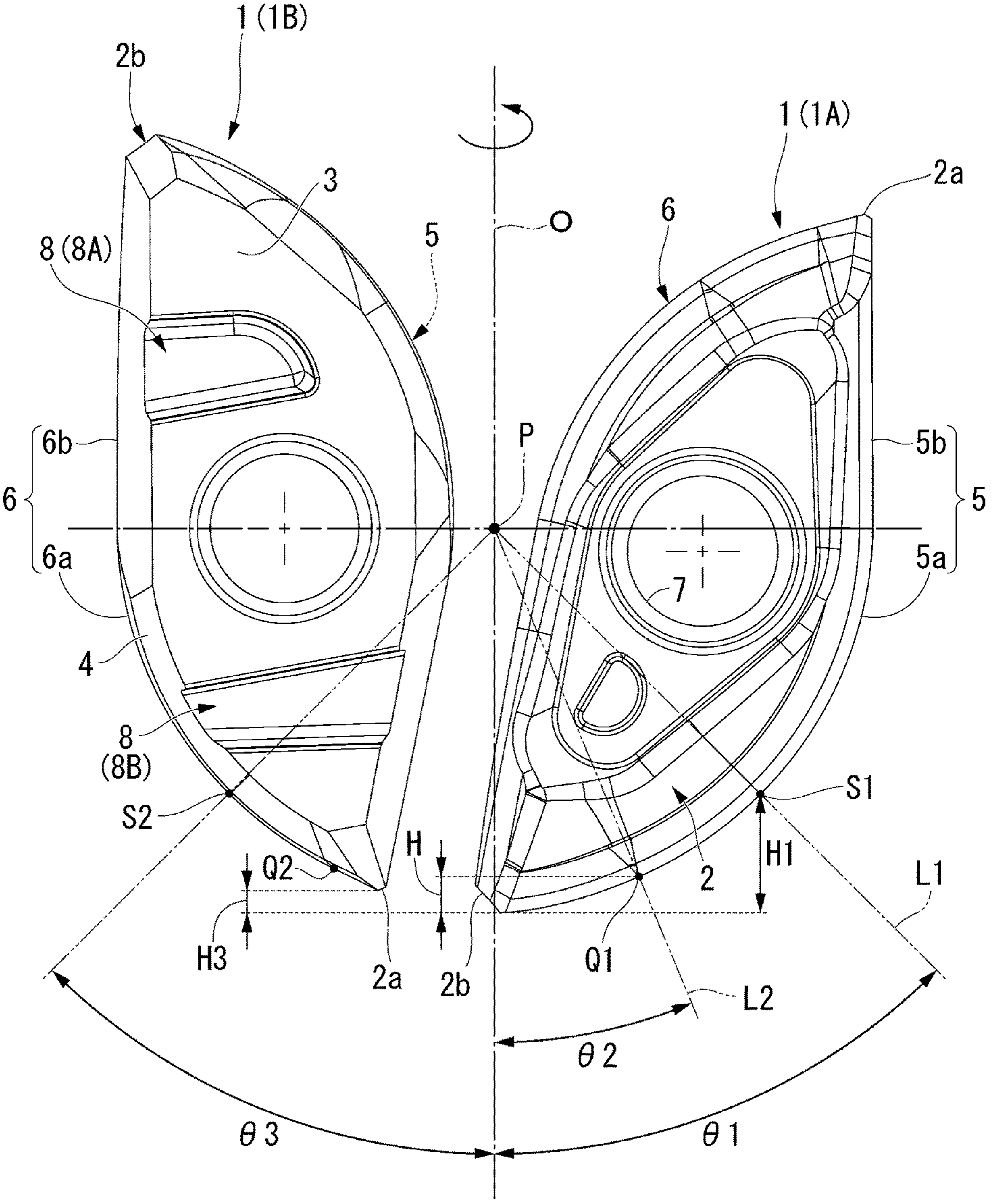
FIG. 10 is a plan view in which two cutting inserts arranged in a positional relationship when attached to a tool body are viewed from a direction facing a rake face of a first cutting insert of which a major cutting edge is used for cutting (a right cutting insert in FIG. 10).

The cutting insert 1 (1A and 1B) includes a major cutting edge 5 and a minor cutting edge 6 each having an arc-shaped cutting edge part and a linear cutting edge part. Regarding the positional relationship when the cutting insert 1 (1A and 1B) is attached to the tool body 11, as shown in FIG. 10, there is an axial step H3 between the tip of the major cutting edge 5 of one cutting insert 1A and the tip of the minor cutting edge 6 of the other cutting insert 1B. Specifically, as shown in FIG. 10, a cutting edge tip 2*b* of one cutting insert 1A is located in front of a cutting edge tip 2*a* of the other cutting insert 1B. Further, the major cutting edge 5 of one cutting insert 1A and the minor cutting edge 6 of the other cutting insert 1B are attached so that their rotational trajectories overlap during cutting except for the region corresponding to the step H3.

When the cutting insert 1 (1A and 1B) is attached to the insert attachment seat 12 (12A and 12B), the first cutting insert 1A is disposed so that an arc-shaped cutting edge part 5*a* of the major cutting edge 5 extends from the vicinity of the axis O on the tip side of the tool body 11 to the rear end side. Further, the second cutting insert 1B is disposed so that an arc-shaped cutting edge part 6*a* of the minor cutting edge 6 extends from a position away from the axis O on the tip side of the tool body 11 to the outer peripheral side to the rear end side.

Accordingly, even in the cutting-edge-replaceable ball end mill 100 of this embodiment shown in FIG. 1, the first insert attachment seat 12A is formed by cutting the tip side of the tool body 11 to a range including the axis O at the tip side and the second insert attachment seat 12B is formed at a position slightly away from the axis O to the outer peripheral side.

These two cutting inserts 1 (1A and 1B) are located on the same convex hemispherical face on the tip side of the tool body 11.

It is economical because the first cutting insert 1A can be reused as the second cutting insert 1B and the second cutting insert 1B can be reused as the first cutting insert 1A by attaching these cutting inserts 1 to the insert attachment seats 12 on the opposite side when abrasion or the like occurs due to cutting on the major cutting edge 5 of the first cutting insert 1A and the minor cutting edge 6 of the second cutting insert 1B.

(Cutting Insert)

Next, a configuration of the cutting insert 1 of an embodiment of the present invention will be described in detail.

Figure 2:
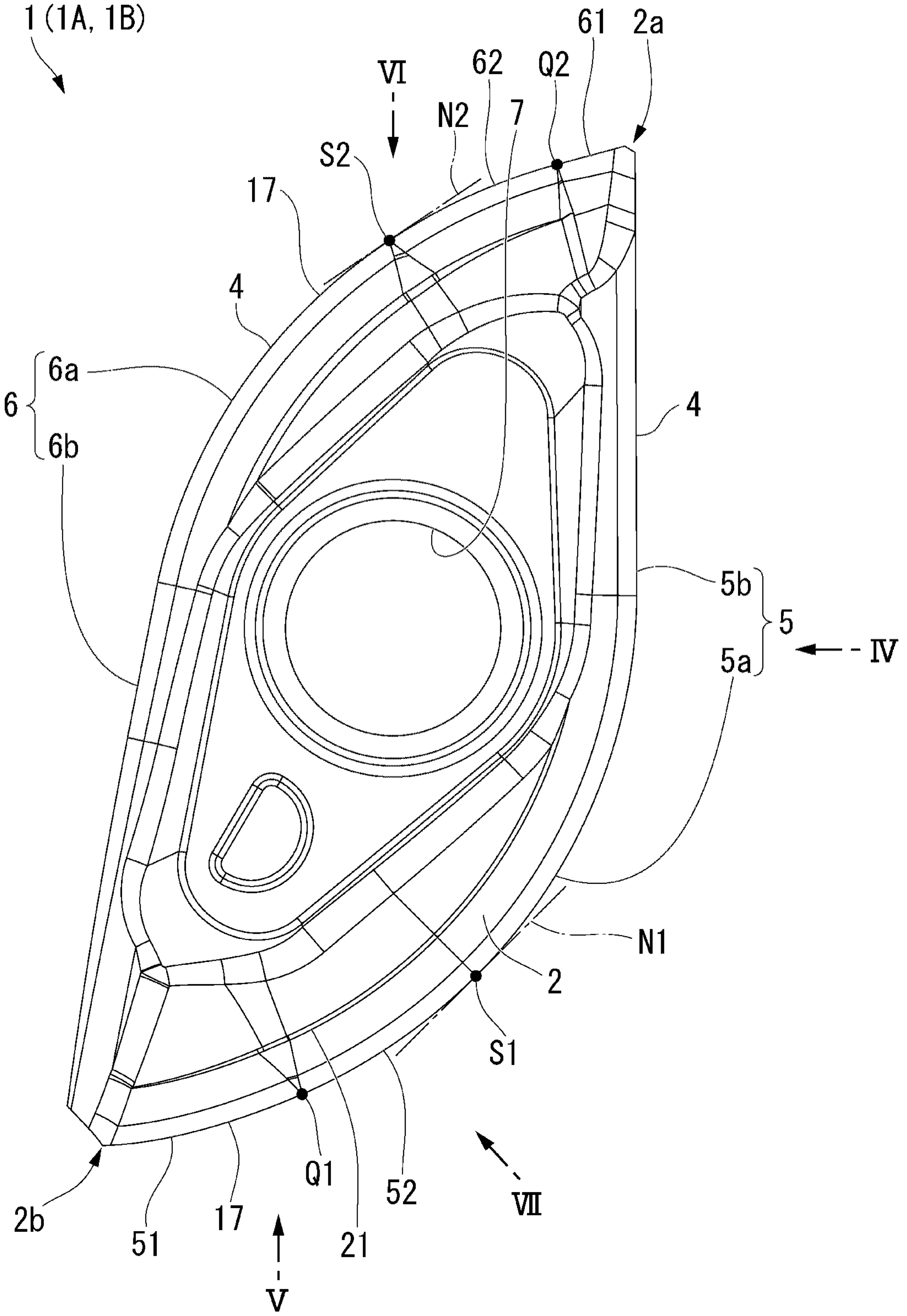
FIG. 2 is a front view showing a configuration of the cutting insert of an embodiment of the present invention.
Figure 3:
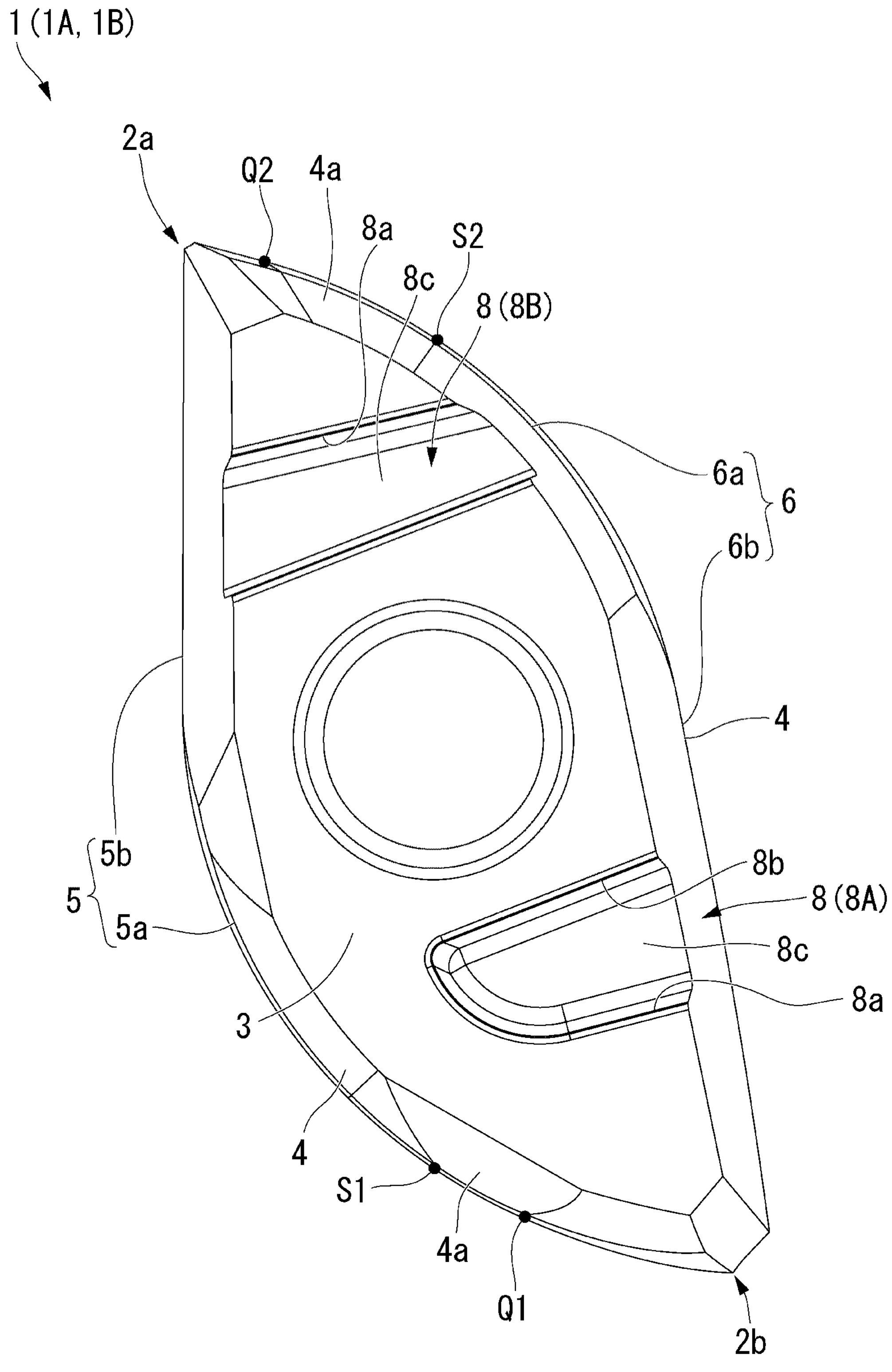
FIG. 3 is a rear view showing a configuration of the cutting insert of an embodiment of the present invention.
Figure 4:
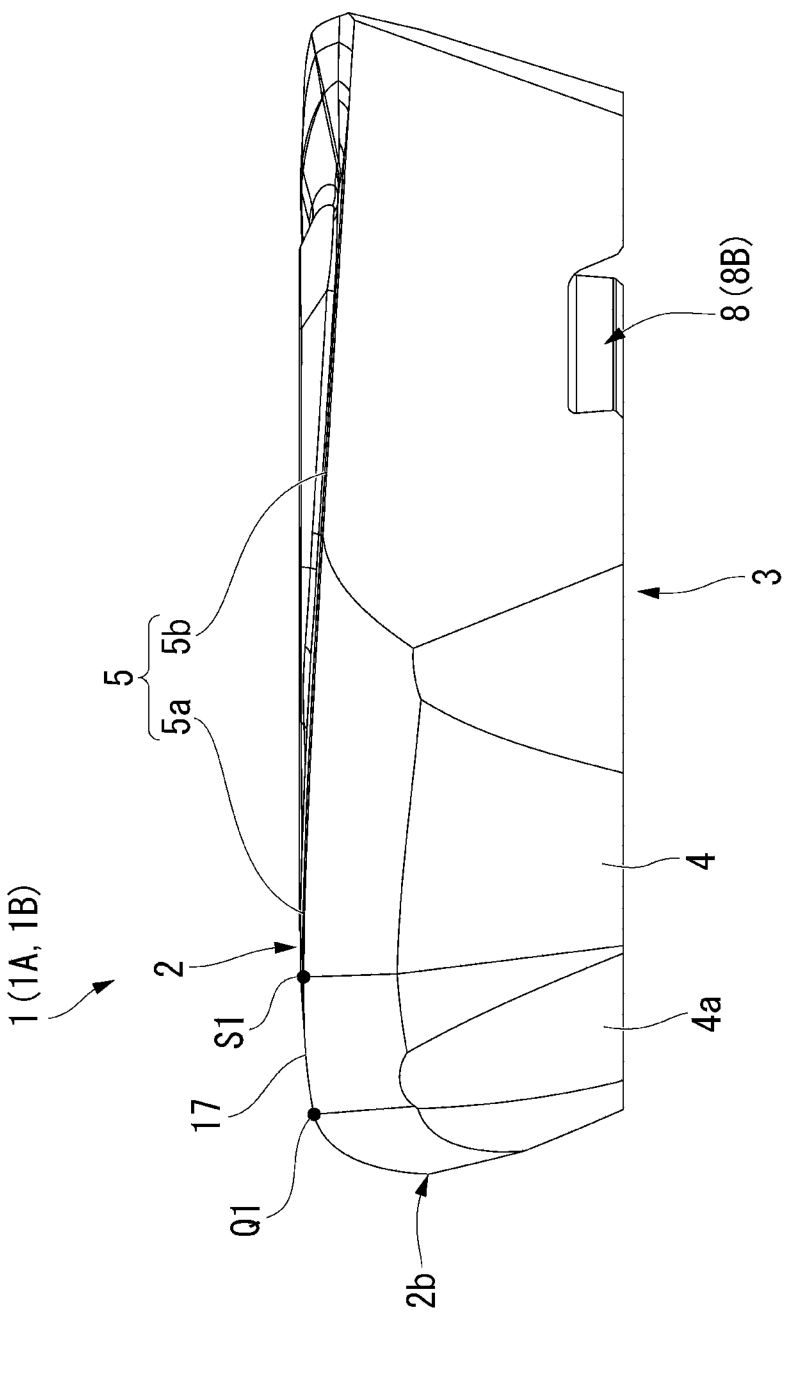
FIG. 4 is a side view when viewed from a direction of an arrow IV in FIG. 2.
Figure 5:
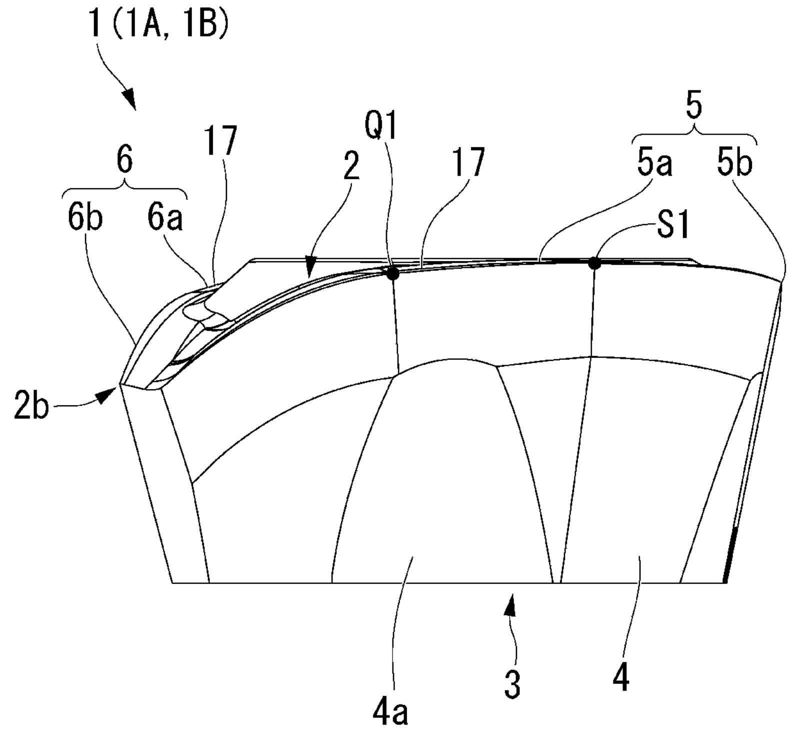
FIG. 5 is a side view when viewed from a direction of an arrow V in FIG. 2.
Figure 6:
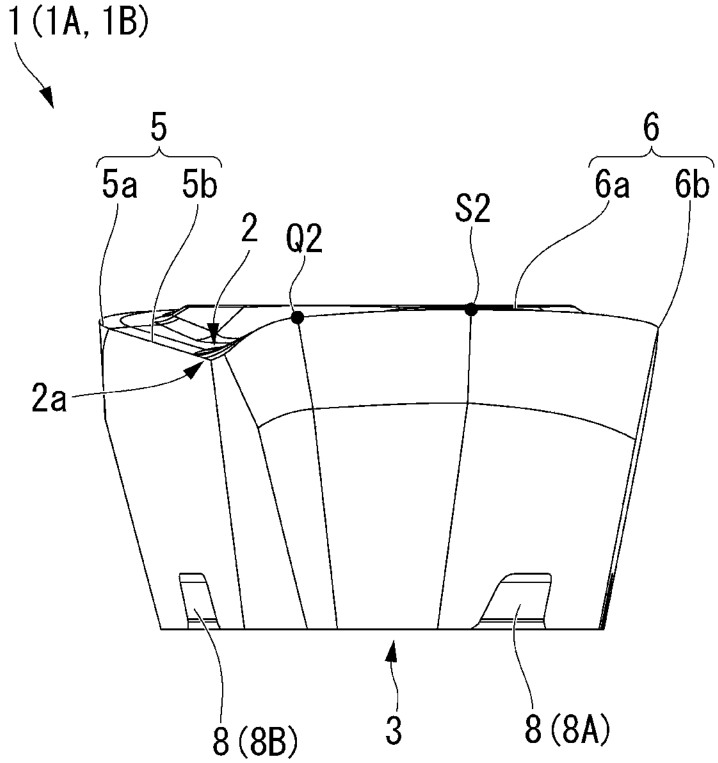
FIG. 6 is a side view when viewed from a direction of an arrow VI in FIG. 2.
Figure 7:
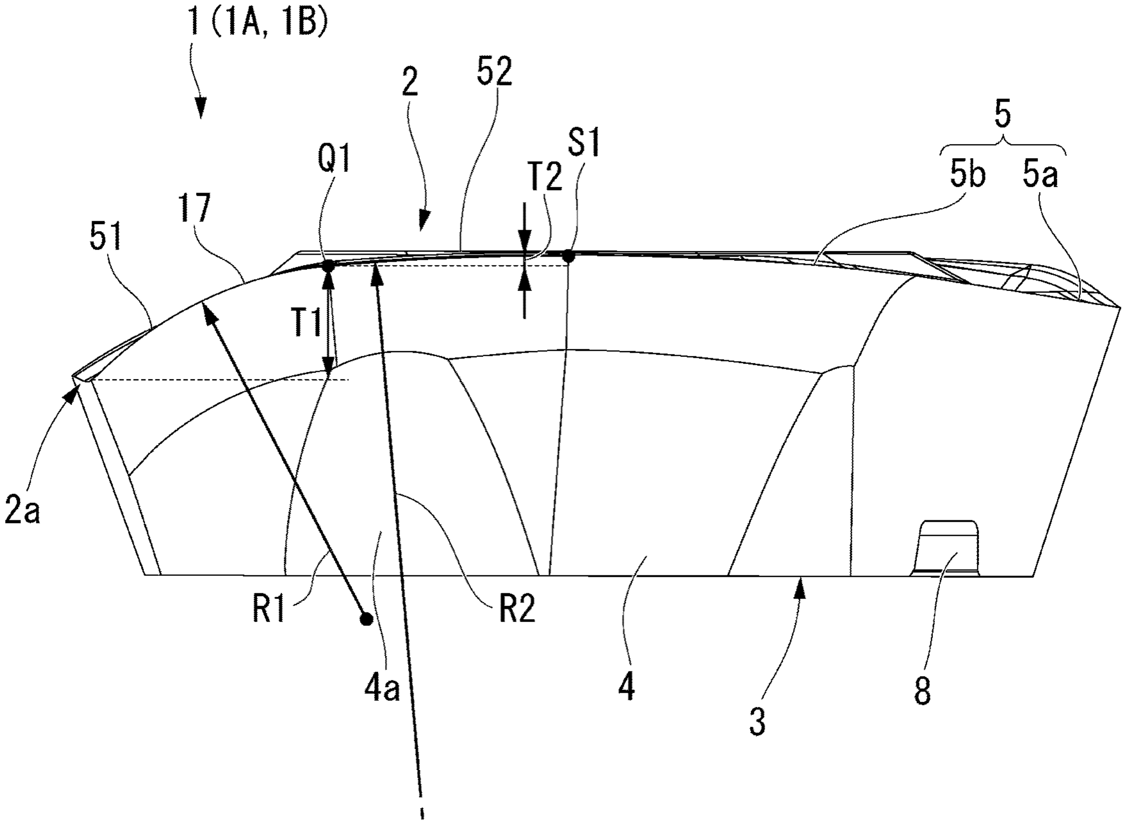
FIG. 7 is a side view when viewed from a direction of an arrow VII in FIG. 2.
Figure 8:
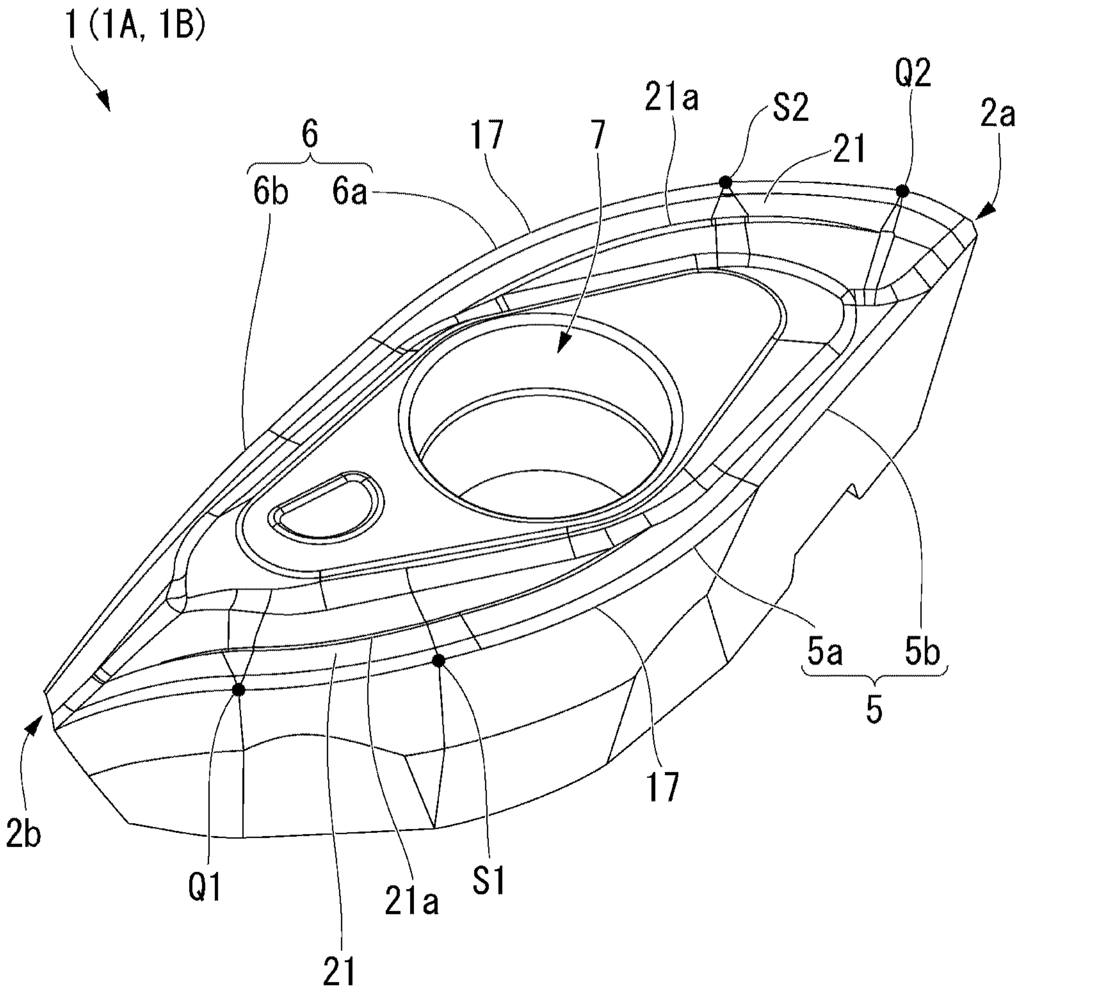
FIG. 8 is a perspective view showing the cutting insert of an embodiment of the present invention.

FIG. 2 is a front view showing a configuration of the cutting insert 1 of an embodiment of the present invention. FIG. 3 is a rear view showing a configuration of the cutting insert 1 of an embodiment of the present invention. FIG. 4 is a side view when viewed from a direction of an arrow IV in FIG. 2. FIG. 5 is a side view when viewed from a direction of an arrow V in FIG. 2. FIG. 6 is a side view when viewed from a direction of an arrow VI in FIG. 2. FIG. 7 is a side view when viewed from a direction of an arrow VII in FIG. 2. FIG. 8 is a perspective view showing a configuration of the cutting insert 1 of an embodiment of the present invention. FIG. 10 is a plan view in which two cutting inserts 1 (1A and 1B) arranged in a positional relationship when attached to the tool body 11 are viewed from a direction facing a rake face of the first cutting insert 1A of which the major cutting edge 5 is used for cutting (the right cutting insert in FIG. 10).

As shown in FIGS. 2 to 8, the cutting insert 1 (1A and 1B) of an embodiment of the present invention is attached to the tool body 11 shown in FIG. 1 to constitute an embodiment of the cutting-edge-replaceable ball end mill 100 of the present invention.

As shown in FIG. 2, the cutting insert 1 (1A and 1B) of this embodiment includes a rake face 2 which faces the rotation direction T of the tool body 11 shown in FIG. 1, a seating face 3 which is seated on a bottom face 12*a* of the insert attachment seat 12 to face the side opposite to the rake face 2, and a flank face 4 which extends around the rake face 2 and the seating face 3.

Two major cutting edges (cutting edge) 5 and minor cutting edges (cutting edges) 6 are formed on a ridge line formed by the rake face 2 and the flank face 4 at the intersection position thereof (hereinafter, referred to as an intersection ridge line part).

As shown in FIG. 2, the major cutting edge 5 and the minor cutting edge 6 respectively include arc-shaped cutting edge parts 5*a* and 6*a* which extend in an arc shape when the cutting insert 1 is viewed from the front in the axial direction facing the rake face 2 and linear cutting edge parts 5*b* and 6*b* which extend to be in contact with the arc-shaped cutting edge parts 5*a* and 6*a*. These two major cutting edges 5 and minor cutting edges 6 are formed by alternately arranging the arc-shaped cutting edge parts 5*a* and 6*a* and the linear cutting edge parts 5*b* and 6*b* in the circumferential direction of the rake face 2.

As shown in FIGS. 4, 5, and 6, in the major cutting edge 5 and the minor cutting edge 6 of this embodiment, at least the arc-shaped cutting edge parts 5*a* and 6*a* respectively include a convex curved part 17 which moves away from the seating face 3 and moves close to the seating face 3 as it moves away from the linear cutting edge parts 5*b* and 6*b*. A point in which the convex curved part 17 formed by these arc-shaped cutting edge parts 5*a* and 6*a* moves farthest from this seating face 3 (the most protruding point from the seating face 3) becomes each of a major cutting edge most protruding point S1 and a minor cutting edge most protruding point S2.

As shown in FIGS. 4 and 5, in the side view when viewed from a direction facing the flank face 4, the arc-shaped cutting edge part 5*a* has a major cutting edge curvature change point Q1 between the major cutting edge most protruding point S1 farthest from the seating face 3 on the convex curved part 17 and the cutting edge tip 2*b* of the arc-shaped cutting edge part 5*a*. Further, as shown in FIG. 6, the arc-shaped cutting edge part 6*a* of the minor cutting edge 6 also has a curvature change point Q2 between a minor cutting edge most protruding point S2 farthest from the seating face 3 on the convex curved part 17 and the cutting edge tip 2*a* of the arc-shaped cutting edge part 6*a*.

When the arc-shaped cutting edge part 5*a* (6*a*) from the cutting edge tip 2*b* (2*a*) to the major cutting edge most protruding point S1 (the minor cutting edge most protruding point S2) is composed of arcs or curves with two different curvatures, the curvature change point Q1 (Q2) can be specified at a point in which the curvatures of two arcs or curves differ from each other. Further, when there is a line or curve between two different arcs, the arc-shaped cutting edge part can be specified as a tip point on the side of the arc-shaped cutting edge tip 2*b* (2*a*) closest to the most protruding point S1 (S2). Furthermore, when the side of the cutting edge tip 2*b* (2*a*) is curved and the side of the most protruding point S1 (S2) is linear, the arc-shaped cutting edge part can be specified as a point in which the curve and the line intersect each other.

Further, it is preferable that the curvature on the side of the most protruding point S1 (S2) is twice or more the curvature on the side of the cutting edge tip 2*b* (2*a*) with respect to the curvature change point Q1 (Q2). That is, it is possible to specify the curvature change point Q1 (Q2) by measuring the curvature from the cutting edge tip 2*b* (2*a*) to the most protruding point S1 (S2).

In the side view (FIG. 7) when viewed in a direction facing the flank face 4, that is, a normal direction with respect to a tangent line N1 of the arc-shaped cutting edge part 5*a* passing through the major cutting edge most protruding point S1 (a direction of an arrow VII in FIG. 2), the arc-shaped cutting edge part 5*a* includes arcs having at least two different curvatures. Specifically, the arc-shaped cutting edge part 5*a* is formed by a first cutting edge 51 which has a curved shape and is located on the side of the cutting edge tip 2*b* with the major cutting edge curvature change point Q1 as a boundary and a second cutting edge 52 which has a curved shape (or a linear shape) with a curvature smaller than that of the first cutting edge 51 and is located on the side of the major cutting edge most protruding point S1. In this way, the arc-shaped cutting edge part 5*a* of this embodiment includes the first cutting edge 51 which is formed in a curved shape such that the side of the cutting edge tip 2*b* protrudes upward with respect to the seating face 3 with the major cutting edge curvature change point Q1 as a boundary and the second cutting edge 52 which is formed such that the side of the major cutting edge most protruding point S1 protrudes upward with respect to the seating face 3. The intersection between the first cutting edge 51 and the second cutting edge 52 is the major cutting edge curvature change point Q1.

Further, also in the arc-shaped cutting edge part 6*a*, in the side view when viewed in a direction facing the flank face 4, that is, a normal direction with respect to a tangent line N2 of the arc-shaped cutting edge part 6*a* passing through the minor cutting edge most protruding point S2, the arc-shaped cutting edge part 6*a* includes arcs having at least two different curvatures. Specifically, the arc-shaped cutting edge part 6*a* is formed by a first cutting edge 61 which has a curved shape and is located on the side of the cutting edge tip 2*a* with the minor cutting edge curvature change point Q2 as a boundary and a second cutting edge 62 which has a curved shape (or a linear shape) with a curvature smaller than that of the first cutting edge 61 and is located on the side of the minor cutting edge most protruding point S2. In this way, the arc-shaped cutting edge part 6*a* of this embodiment includes the first cutting edge 61 which is formed in a curved shape such that the side of the cutting edge tip 2*a* protrudes upward with respect to the seating face 3 with the minor cutting edge curvature change point Q2 as a boundary and the second cutting edge 62 which is formed such that the side of the minor cutting edge most protruding point S2 protrudes upward with respect to the seating face 3. The intersection between the first cutting edge 61 and the second cutting edge 62 is the minor cutting edge curvature change point Q2.

The arc-shaped cutting edge part 5*a* is formed by the first cutting edge 51 and the second cutting edge 52 forming arcs with two different curvatures as described above. When the radius of the arc of the first cutting edge 51 on the side of the cutting edge tip 2*b* is an arc radius R1 and the radius of the arc of the second cutting edge 52 on the side of the major cutting edge most protruding point S1 is an arc radius R2 in the arc-shaped cutting edge part 5*a*, a relationship of R1<R2 is established and the arc radius R1 is formed to have a size of ½ or less of the arc radius R2. In this embodiment, specifically, the sizes of these two arc radii R1 and R2 are set such that R1=6.8 mm and R2=56.4 mm and satisfy a relationship that the arc radius R2 is twice or more the arc radius R2.

Further, the arc-shaped cutting edge part 6*a* may also be formed by the first cutting edge 61 and the second cutting edge 62 forming arcs with two different curvatures as described above and in that case, the arc radius R2 of the second cutting edge 62 is larger than the arc radius R1 of the first cutting edge 61. That is, the arc-shaped cutting edge part 6*a* also establishes a relationship of R1<R2 and the arc radius R1 is formed to have a size of ½ or less of the arc radius R2. In this embodiment, specifically, the sizes of these two arc radii R1 and R2 are set such that R1=2.7 mm and R2=56.4 mm and satisfy a relationship that the arc radius R2 is at least twice the arc radius R2.

TABLE 1

| Horizontal axis Distance [mm] from cutting edge tip in direction parallel to seating face | Vertical axis (height) Direction perpendicular to seating face (1) Height [mm] from seating face | (2) Height [mm] from cutting edge tip | (3) Ratio [%] when range from cutting edge tip to most protruding point is 100% |
|---|---|---|---|
| 0 | 4.571 | 0 | 0.0% |
| 1 | 5.608 | 1.037 | 35.4% |
| 2 | 6.328 | 1.757 | 60.0% |
| 3 | 6.814 | 2.243 | 76.6% |
| 4 | 7.118 | 2.547 | 87.0% |
| (Curvature change point) 4.839 | 7.25 | 2.679 | 91.5% |
| 5 | 7.265 | 2.694 | 92.0% |
| 6 | 7.347 | 2.776 | 94.8% |
| 7 | 7.412 | 2.841 | 97.1% |
| 8 | 7.458 | 2.887 | 98.6% |
| 9 | 7.487 | 2.916 | 99.6% |
| 10 | 7.496 | 2.925 | 99.9% |
| (Most protruding point) 10.4 | 7.498 | 2.927 | 100.0% |

Table 1 shows a cutting edge profile in the side view (FIG. 7) when viewed from a normal direction with respect to the tangent line N1 of the arc-shaped cutting edge part 5*a* passing through the major cutting edge most protruding point S1 of this embodiment (a direction of an arrow VII of FIG. 2). When the cutting edge position is measured by 1 mm in a direction parallel to the seating face 3 toward the major cutting edge most protruding point S1 with the cutting edge tip 2*b* as an origin, the “height [mm] from the seating face 3 in a direction perpendicular to the seating face 3” changes like (1) and the “height [mm] from the cutting edge tip 2*b* in a direction perpendicular to the seating face 3" changes like (2). Further, the "ratio [%] of (the height of the cutting edge at each measurement point) when the height from the cutting edge tip 2*b* to the major cutting edge most protruding point S1 in a direction perpendicular to the seating face 3 is 100%" is (3).

Figure 11A:
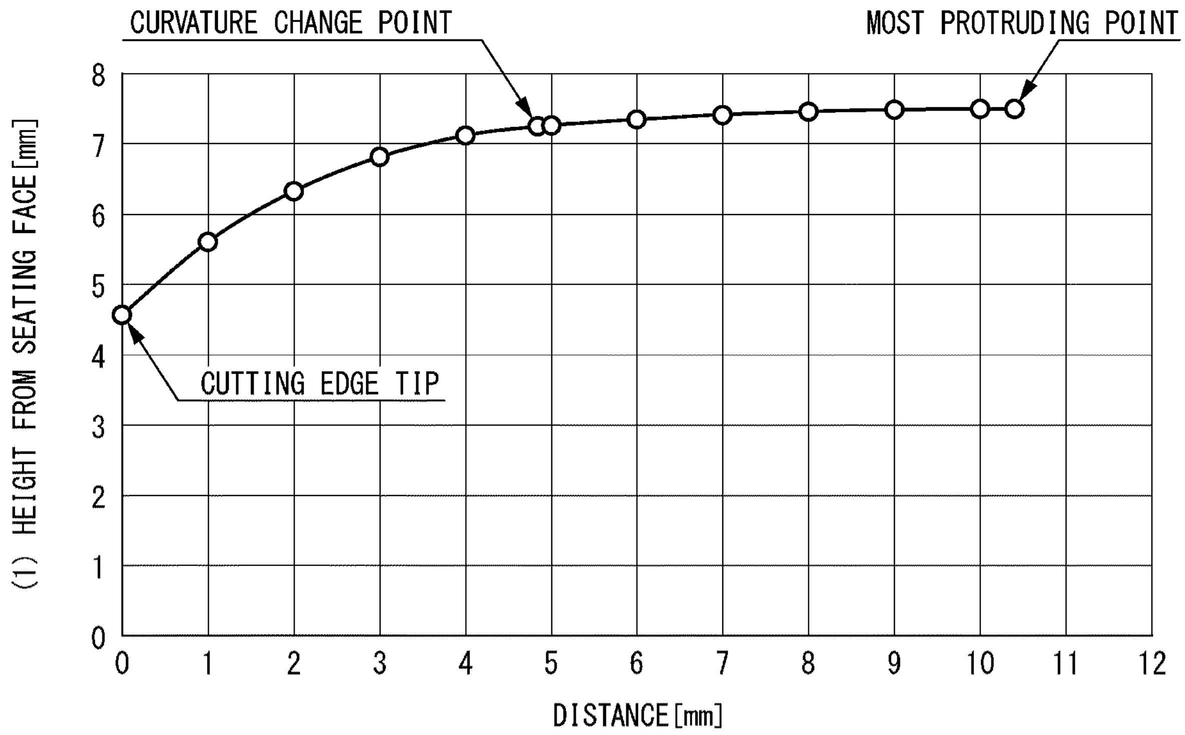
FIG. 11A is a graph showing a relationship between a height and a distance from a cutting edge tip **2*b* at an arbitrary position on an arc-shaped cutting edge part 5*a***.

FIG. 11A is a graph showing a relationship between the height from the seating face 3 in a direction perpendicular to the seating face 3 and the distance from the cutting edge tip 2*b* at an arbitrary position on the arc-shaped cutting edge part 5*a* in a direction parallel to the seating face 3 when the horizontal axis indicates the "distance [mm] from the cutting edge tip 2*b* in a direction parallel to the seating face 3" and the vertical axis indicates the above (1) in Table 1. Here, the height from the seating face 3 to the arc-shaped cutting edge part 5*a* means the so-called "thickness".

Figure 13A:
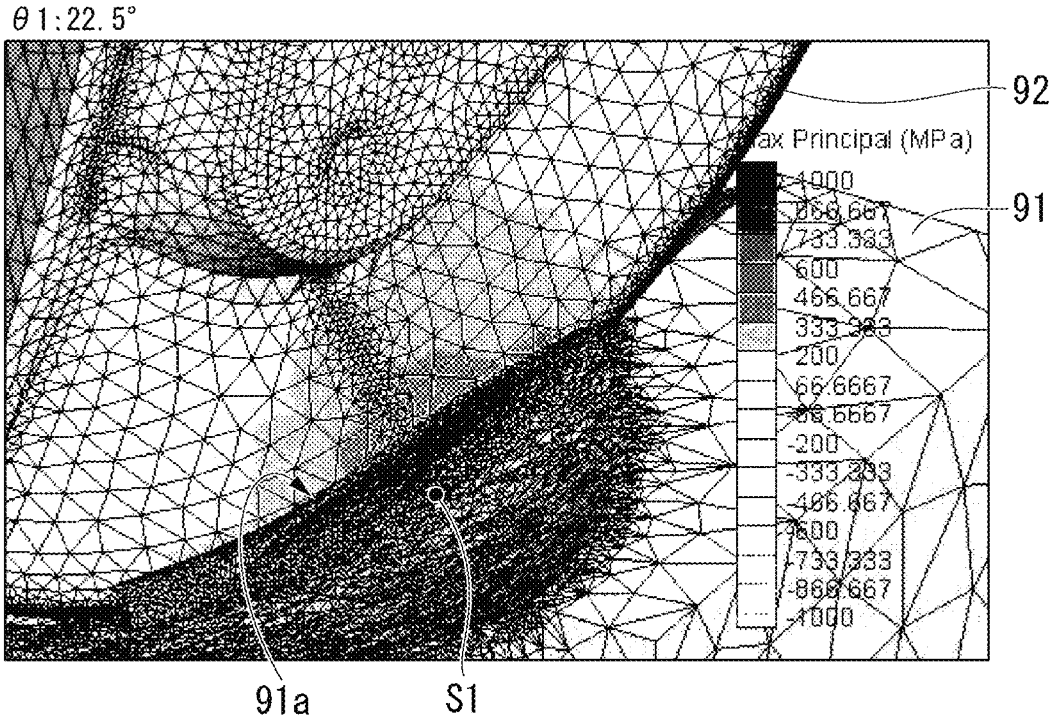
FIG. 13A is a diagram showing maximum principal stress applied to a cutting insert and a chip and a chip shape by simulation analysis during cutting with a conventional cutting insert in which an angle from an axis to a most protruding point is 22.5°.

In the side view shown in FIG. 7 when viewed from a normal direction with respect to the tangent line N1 of the arc-shaped cutting edge part 5*a*, for example, as shown in FIG. 13A, the height from the seating face 3 to the cutting edge tip 2*b* is 4.571 mm, the height from the seating face 3 to the major cutting edge curvature change point Q1 is 7.250 mm, and the height from the seating face 3 to the major cutting edge most protruding point S1 is 7.498 mm.

In this embodiment, in the side view shown in FIG. 7 when viewed from a normal direction with respect to the tangent line N1 of the arc-shaped cutting edge part 5*a*, the height T1 from the seating face 3 in a range from the cutting edge tip 2*b* to the major cutting edge curvature change point Q1 is ten times or more the height T2 from the seating face 3 in a range from the major cutting edge curvature change point Q1 to the major cutting edge most protruding point S1.

As a specific example, the height T1 from the seating face 3 in a range from the cutting edge tip 2*b* to the major cutting edge curvature change point Q1 is 2.679 mm, the height T2 from the seating face 3 in a range from the major cutting edge curvature change point Q1 to the major cutting edge most protruding point S1 is 0.248 mm, and the height T1 is ten times or more the height T2.

Figure 11B:
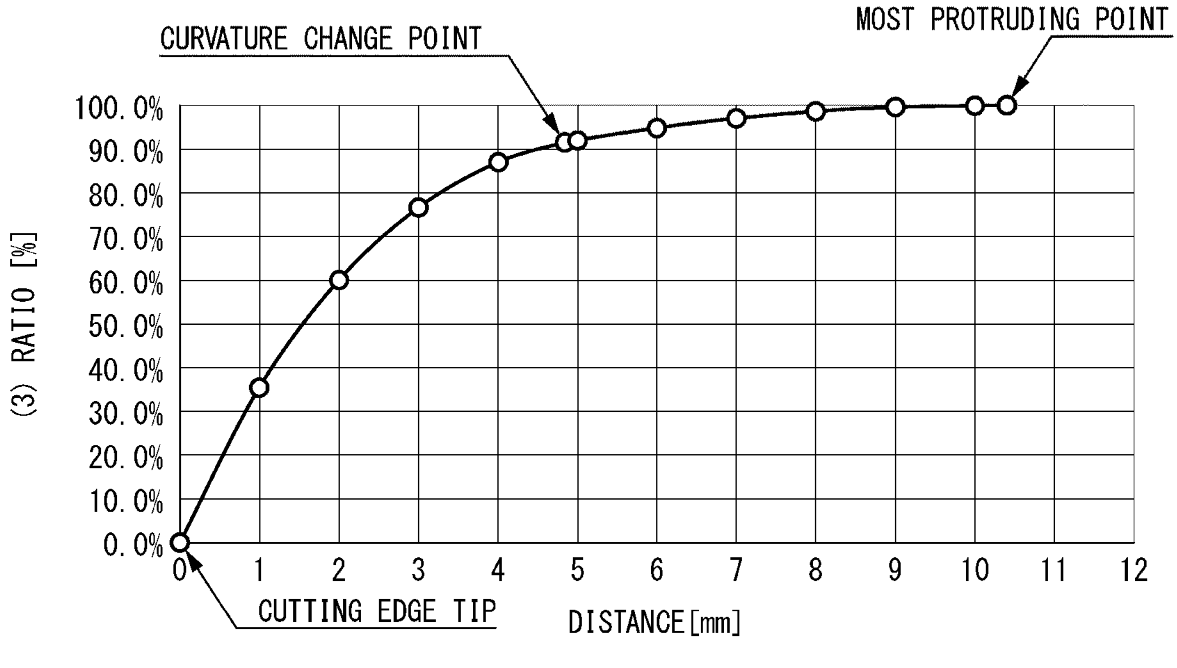
FIG. 11B is a graph showing a relationship between a distance from a cutting edge tip **2*b* to a most protruding point in a direction parallel to a seating face at an arbitrary position on the arc-shaped cutting edge part 5*a*** and a ratio of a height of the arbitrary point on the arc-shaped cutting edge part with respect to a height of the most protruding point from the cutting edge tip in a direction perpendicular to the seating face.

FIG. 11B is a graph of which a horizontal axis indicates the "distance [mm] from the cutting edge tip 2*b* in a direction parallel to the seating face 3" and a vertical axis indicates the "ratio [%] when the distance from the cutting edge tip 2*b* to the most protruding point S1 is 100%" in Table 1.

As shown in FIG. 11B, when the height from the cutting edge tip 2*b* to the major cutting edge most protruding point S1 is taken as the reference (100%), the height from the cutting edge tip 2*b* to the major cutting edge curvature change point Q1 is about 92% of the reference. In this embodiment, the height at a plurality of arbitrary points from the major cutting edge curvature change point Q1 to the major cutting edge most protruding point S1 satisfies 90% or more of the standard and the height difference is small from the major cutting edge curvature change point Q1 to the major cutting edge most protruding point S1. On the other hand, the height at a plurality of arbitrary points from the major cutting edge curvature change point Q1 to the cutting edge tip 2*b* ranges from 90% to 0% of the reference and the height varies greatly between adjacent points. Thus, the height difference on the side of the cutting edge tip 2*b* is larger than the height difference on the side of the major cutting edge most protruding point S1 with the major cutting edge curvature change point Q1 as a boundary and a curved shape is formed to abruptly approach the seating face 3 from the cutting edge tip 2*b* to the major cutting edge curvature change point Q1.

In this embodiment, in the arc-shaped cutting edge part 5*a* including the first cutting edge 51 and the second cutting edge R52, the first cutting edge 51 located on the side of the cutting edge tip 2*b* has a steeper arc curve than the second cutting edge 52 located on the side of the major cutting edge most protruding point S1. Further, the same can be applied to the arc-shaped cutting edge part 6*a*.

In this way, in this embodiment, it is possible to ensure durability by ensuring the thickness equal to or larger than 90% of the major cutting edge most protruding point S1 on the side of the major cutting edge most protruding point S1 including the major cutting edge curvature change point Q1 in the arc-shaped cutting edge parts 5*a* and 6*a*. Further, the arc-shaped cutting edge parts 5*a* and 6*a* come into smooth contact with the work material by forming an arc curve on the side of the cutting edge tips 2*b* and 2*a* to be steeper than the major cutting edge curvature change point Q1 and hence the effect of reducing the cutting resistance is obtained by reducing the impact acting on the cutting edge.

In the rake face 2 of this embodiment, as shown in FIGS. 2 and 8, breakers 21 are formed in the vicinity of the intersection ridge line part (the arc-shaped cutting edge parts 5*a* and 6*a*) to form convex curves in a direction moving away from the seating face 3. In a cross-section orthogonal to the major cutting edge 5 and the minor cutting edge 6, the vertex (ridge line) 21*a* of each breaker 21 has a larger distance (height) from the seating face 3 than the arc-shaped cutting edge parts 5*a* and 6*a*. The breaker 21 is preferably formed around the center point P of the arc-shaped cutting edge parts 5*a* and 6*a* located on the axis O within the range of $0° < \theta 3 < 50°$ from the axis O.

As shown in FIG. 3, a groove part 8 which is engageable with a convex part protruding from the bottom face 12*a* of the first insert attachment seat 12A is formed on the side of the seating face 3 of the cutting insert 1. Two groove parts 8 are formed on both radial sides of the attachment hole 7 for attaching the cutting insert 1. The major cutting edge curvature change point Q1 is formed closer to the cutting edge tip 2*b* than one groove part 8B close to the arc-shaped cutting edge part 5*a* in these two groove parts 8A and 8B. The minor cutting edge curvature change point Q2 is formed closer to the cutting edge tip 2*a* than the other groove part 8A which is close to the arc-shaped cutting edge part 6*a*.

The groove part 8B which is close to the cutting edge tip 2*b* is a groove of which one longitudinal end side opens to the side face on the side of the minor cutting edge 6 and the other end side opens to the side face on the side of the major cutting edge 5 and the width on the side of the minor cutting edge 6 is narrower than the width on the side of the major cutting edge 5. The minor cutting edge most protruding point S2 and the minor cutting edge curvature change point Q2 in the minor cutting edge 6 are formed at positions that are not affected by the thickness reduction due to the groove part 8B and the thickness at the minor cutting edge most protruding point S2 and the minor cutting edge curvature change point Q2 is sufficiently ensured. Therefore, it is possible to improve the strength of the cutting insert 1 and to prevent the cutting insert 1 from being damaged by a load during cutting.

On the other hand, the groove part 8A close to the cutting edge tip 2*a* is formed in a blind groove shape of which one longitudinal side opens to the side face on the side of the minor cutting edge 6, but the other end side does not open to the side face on the side of the major cutting edge 5. Therefore, the major cutting edge most protruding point S1 and the major cutting edge curvature change point Q1 in the major cutting edge 5 are formed at positions that are not affected by the thickness reduction due to the groove part 8A, and the thickness at the major cutting edge most protruding point S1 and the major cutting edge curvature change point Q1 is sufficiently ensured. Thus, also in the major cutting edge 5, it is possible to prevent damage by improving the strength of the arc-shaped cutting edge part 5*a*.

Further, as shown in FIG. 10, when the center point of the hemispherical face of the tool body 11 (cutting insert 1) on the axis O is defined as P, the angle formed by the axis O and the line L1 connecting the center point P and the major cutting edge most protruding point S1 is defined as θ1, and the angle formed by the axis O and the line L2 connecting the center point P and the major cutting edge curvature change point Q1 is defined as θ2 with the cutting insert 1 attached to the tool body 11, the angle θ2 is smaller than the angle θ1 (θ2<θ1).

Here, the angle θ1 formed by the axis O and the line L1 connecting the center point P and the major cutting edge most protruding point S1 is within the range of 30°≤θ1≤50° and is more preferably within the range of 40°≤θ1≤50°. In this embodiment, the angle θ1 from the axis O to the major cutting edge most protruding point S1 is 45°.

If the cutting depth is increased by rough machining when the major cutting edge most protruding point S1 exists at an angle position in which the angle θ1 is smaller than 30°, a problem arises in that the cutting insert has a part in which tensile stress is concentrated. On the other hand, when the major cutting edge most protruding point S1 exists at an angle position in which the angle θ1 exceeds 50°, the major cutting edge most protruding point S1 is provided at a position away from the contact point between the work material and the cutting insert toward the rear end side of the tool and the effect of dispersing stress concentration becomes smaller. Thus, it is preferable that the angle θ1 from the axis O to the major cutting edge most protruding point S1 is within the above-described range.

Further, the angle θ2 formed by the axis O and the line L2 connecting the center point P and the major cutting edge curvature change point Q1 is within the range of 15°≤θ2≤40° and is more preferably within the range of 17°≤θ2≤37°. In this embodiment, the angle θ2 from the axis O to the curvature change point is 22.5°.

If the major cutting edge curvature change point Q1 is provided at an angle position in which the angle θ2 is smaller than 15°, stress concentration occurs at the boundary between the major cutting edge 5 and the work material under conditions that the cutting depth is larger than the major cutting edge curvature change point Q1, resulting in chipping and shortening the tool life. On the other hand, when the major cutting edge curvature change point Q1 exists at an angle position in which the angle θ2 exceeds 40°, a problem arises in that a part in which stress is concentrated occurs at the tip of the arc-shaped cutting edge part 5*a*. Thus, it is preferable to set the angle θ2 from the axis O to the major cutting edge curvature change point Q1 within the above-described range.

FIGS. 12A to 16 show the results of simulation analysis when cutting a work material with a conventional cutting insert or the cutting insert of the present invention.

The conditions for the simulation analysis of FIGS. 12A to 14B were as follows: spindle rotation speed n=2122 [$min^{-1}$], feed amount fz per cutting edge=0.4 [mm/tooth], cutting depth ap×cutting width ae=3×3 [mm], tool diameter=30 [mm], work material SKD61 (44 HRC), and maximum principal stress.

On the other hand, the conditions for the simulation analysis of FIGS. 15 and 16 were as follows: spindle rotation speed n=2122 [$min^{-1}$], feed amount fz per cutting edge=0.4 [mm/tooth], cutting depth ap×cutting width ae=3×3 [mm], tool diameter 30 [mm], work material SKD61 (44 HRC), and minimum principal stress.

Figure 12A:
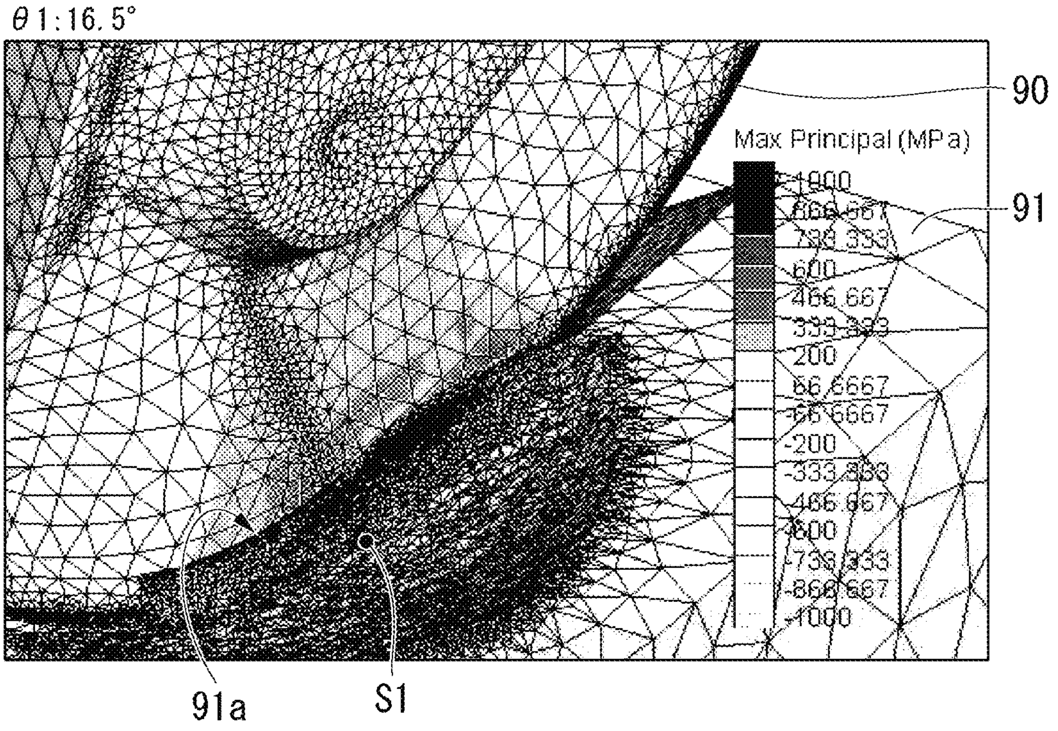
FIG. 12A is a diagram showing maximum principal stress applied to a cutting insert and a chip and a chip shape by simulation analysis during cutting with a conventional cutting insert in which an angle from an axis to a most protruding point is 16.5°.
Figure 12B:
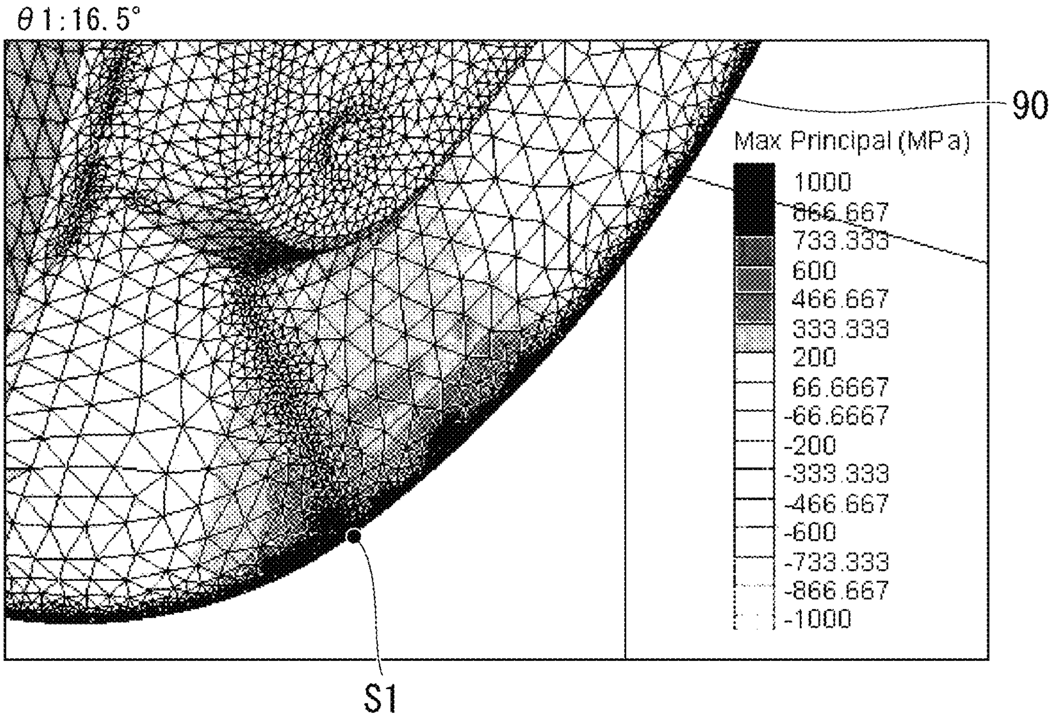
FIG. 12B is a diagram showing maximum principal stress applied to a cutting insert by simulation analysis during cutting with a conventional cutting insert in which an angle from an axis to a most protruding point is 16.5°.

FIG. 12A is a diagram showing cutting stress obtained by simulation analysis during cutting with a conventional cutting insert 90 in which the angle θ1 from the axis O to the major cutting edge most protruding point S1 is 16.5° and shows maximum principal stress applied to the cutting insert 90 and a work material 91 (including a chip 91*a*) due to cutting. FIG. 12B is a diagram showing maximum principal stress applied to the cutting insert 90 by simulation analysis during cutting with the conventional cutting insert 90 in which the angle from the axis O to the major cutting edge most protruding point S1 is 16.5°.

Figure 13B:
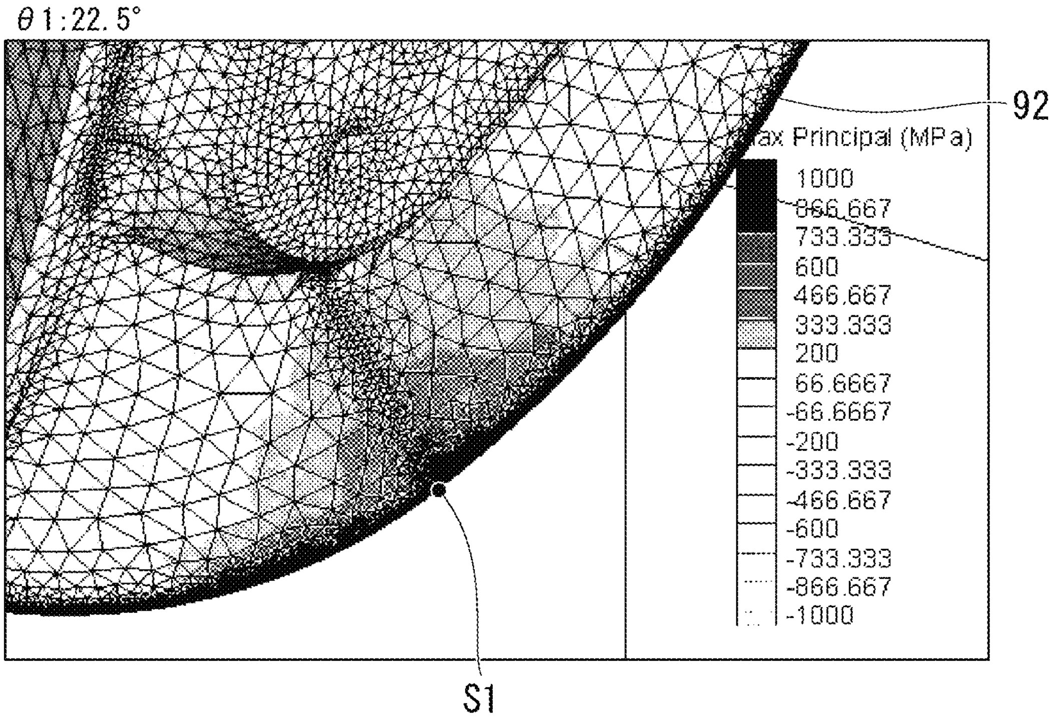
FIG. 13B is a diagram showing maximum principal stress applied to a cutting insert by simulation analysis during cutting with a conventional cutting insert in which an angle from an axis to a most protruding point is 22.5°.

FIG. 13A is a diagram showing cutting stress obtained by simulation analysis during cutting with a conventional cutting insert 92 in which the angle θ1 from the axis O to the major cutting edge most protruding point S1 is 22.5° and shows maximum principal stress applied to the cutting insert 92 and the work material 91 (including the chip 91*a*) due to cutting. FIG. 13B is a diagram showing maximum principal stress applied to the cutting insert 92 by simulation analysis during cutting with the conventional cutting insert 92 in which the angle θ1 from the axis O to the major cutting edge most protruding point S1 is 22.5°. FIG. 13B is a diagram only showing the cutting insert 92 from FIG. 13A.

Figure 14A:
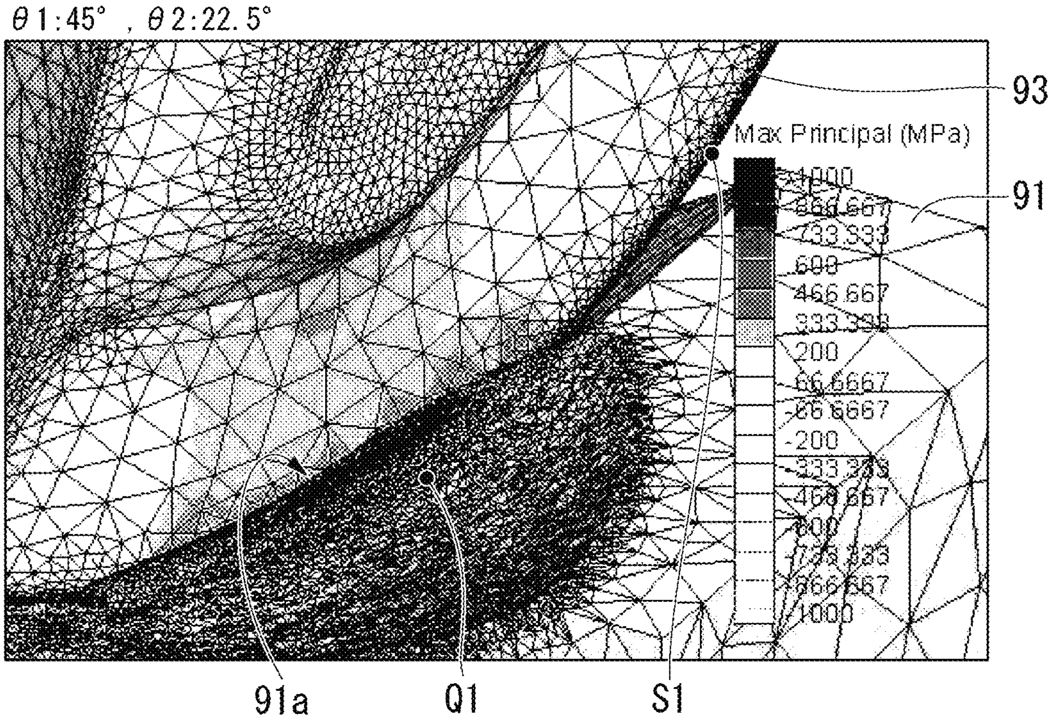
FIG. 14A is a diagram showing maximum principal stress applied to a cutting insert and a chip and a chip shape by simulation analysis during cutting with a cutting insert 1 of an embodiment of the present invention in which an angle from an axis O to a most protruding point S1 is 45° and an angle from an axis to a curvature change point is 22.5°.
Figure 14B:
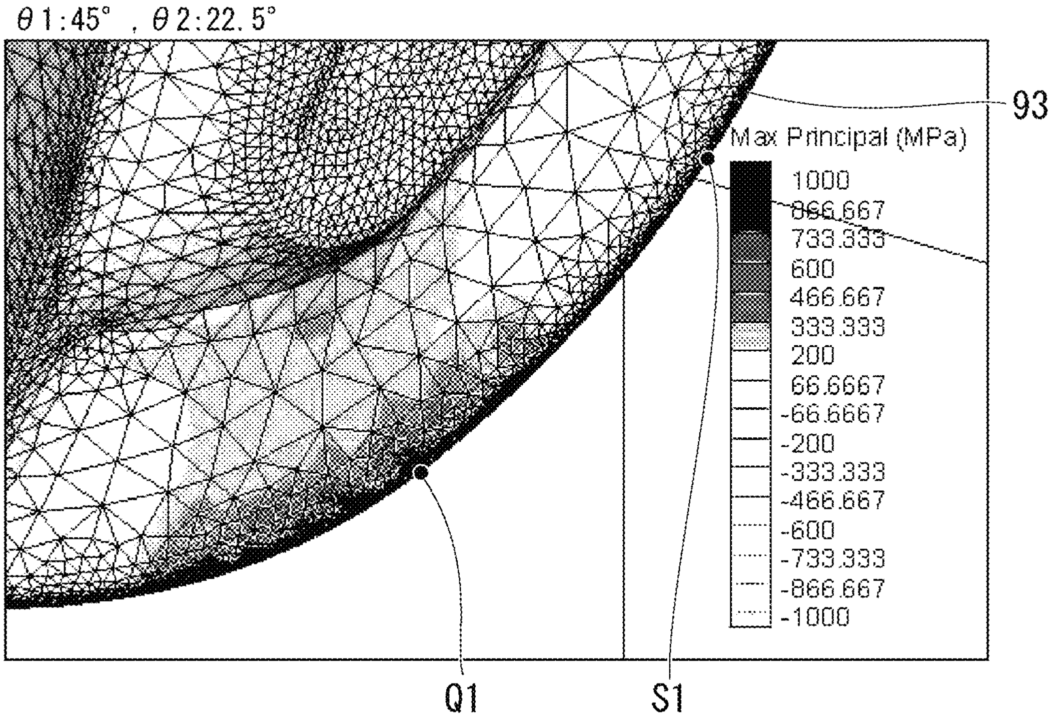
FIG. 14B is a diagram showing maximum principal stress applied to a cutting insert by simulation analysis during cutting with a cutting insert of an embodiment of the present invention in which an angle from an axis to a most protruding point is 45° and an angle from an axis to a curvature change point is 22.5°.

FIG. 14A is a diagram showing cutting stress obtained by simulation analysis during cutting with the cutting insert 1 of an embodiment of the present invention in which the angle θ1 from the axis O to the major cutting edge most protruding point S1 is 45° and the angle θ2 from the axis O to the major cutting edge curvature change point Q1 is 22.5° and shows maximum principal stress applied to the cutting insert 1 and the work material 91 (including the chip 91*a*) due to cutting. FIG. 14B is a diagram showing maximum principal stress applied to the cutting insert 1 by simulation analysis during cutting with the cutting insert 1 of an embodiment of the present invention in which the angle θ1 from the axis O to the major cutting edge most protruding point S1 is 45° and the angle θ2 from the axis O to the major cutting edge curvature change point Q1 is 22.5°. FIG. 14B is a diagram only showing the cutting insert 1 from FIG. 14A.

Figure 15:
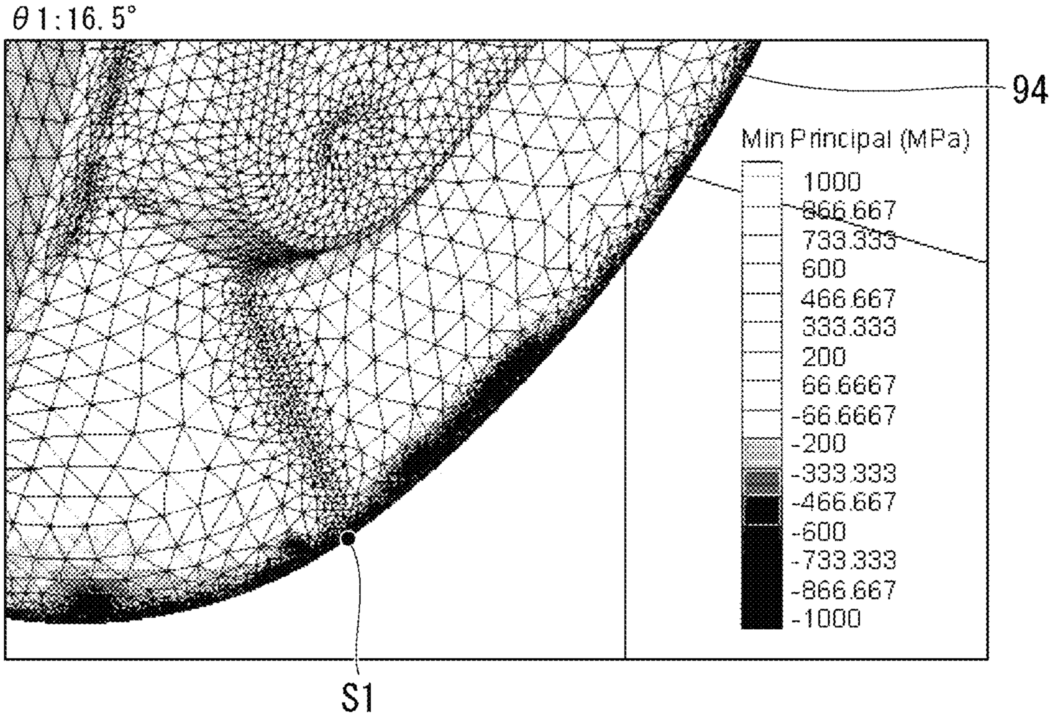
FIG. 15 is a diagram showing maximum principal stress applied to a cutting insert by simulation analysis during cutting with a conventional cutting insert in which an angle θ1 from an axis to a most protruding point is 16.5°.

FIG. 15 is a diagram showing cutting stress by simulation analysis during cutting with a conventional cutting insert 94 in which the angle θ1 from the axis O to the major cutting edge most protruding point S1 is 16.5 and shows minimum principal stress applied to the cutting insert 94 due to cutting.

Figure 16:
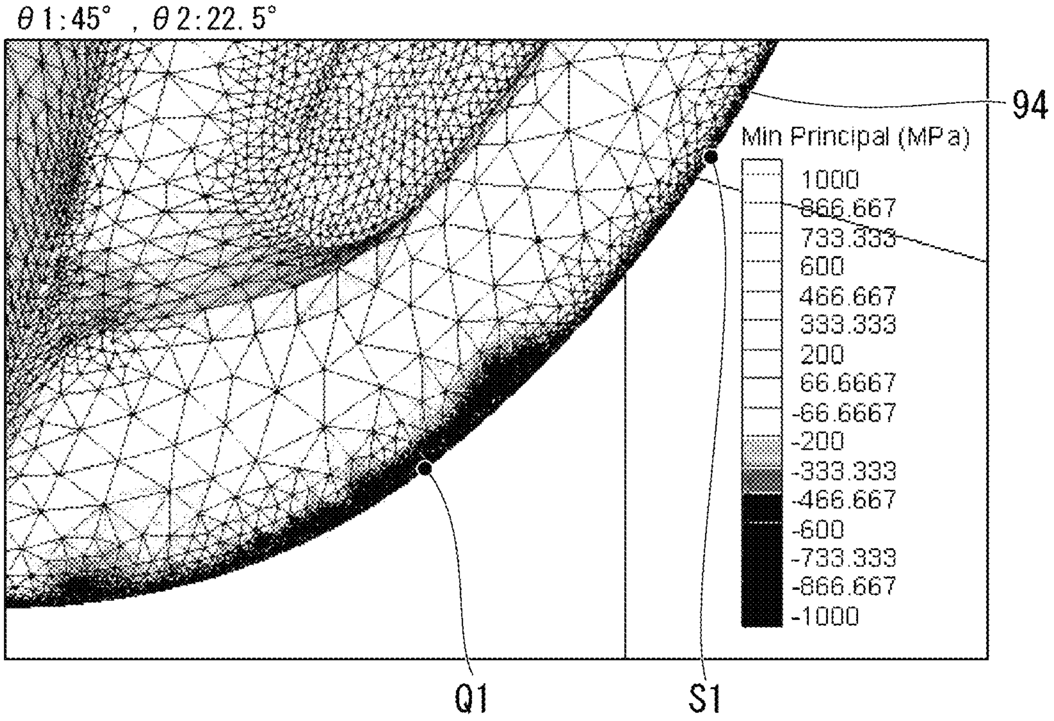
FIG. 16 is a diagram showing maximum principal stress applied to a cutting insert by simulation analysis during cutting with a cutting insert of an embodiment of the present invention in which an angle θ1 from an axis to a most protruding point is 45° and an angle θ2 from an axis to a cutting edge change point is 22.5°.

FIG. 16 is a diagram showing cutting stress by simulation analysis during cutting with the cutting insert 1 of an embodiment of the present invention in which the angle θ1 from the axis O to the major cutting edge most protruding point S1 is 45° and the angle θ2 from the axis O to the major cutting edge curvature change point Q1 is 22.5° and shows minimum principal stress applied to the cutting insert 1 due to cutting.

From FIG. 12B, it can be seen that the maximum principal stress, that is, the tensile stress concentrates during cutting near the major cutting edge most protruding point S1 when the major cutting edge most protruding point S1 is located at a position in which the angle θ1 from the axis O is 16.5°. Further, from FIG. 15, it can be seen that there is a part in which the minimum principal stress, that is, the compressive stress concentrates before and after the major cutting edge most protruding point S1 when the major cutting edge most protruding point S1 is provided at the same position as that of FIG. 12B. From FIGS. 12B and 15, in the conventional arc-shaped cutting edge shape, since both the tensile stress concentration part and the compressive stress concentration part are generated in the arc-shaped cutting edge part 5*a* during cutting, chipping or damage (crack) of the cutting insert is more likely to occur.

Further, even in the cutting edge shape in which the most protruding point S1 is provided at the same position as the curvature change point Q1 of this embodiment (a position in which the angle θ1 from the axis O is 16.5° and the major cutting edge curvature change point Q1 does not exist between the major cutting edge most protruding point S1 and the cutting edge tip 2*b*, it can be seen that the tensile stress concentration part is generated in the vicinity of the major cutting edge most protruding point S1 during cutting as shown in FIGS. 13A and 13B.

On the other hand, as in the major cutting edge 5 of this embodiment, in the case of the cutting edge shape in which the major cutting edge most protruding point S1 is located at a position of 45° from the axis O and the major cutting edge curvature change point Q1 exists between the major cutting edge most protruding point S1 and the cutting edge tip 2*b* (a position in which the angle θ2 from the axis O is 22.5°), stress during cutting is dispersed in a wide range of the arc-shaped cutting edge part 5*a* as shown in FIG. 14B. Similarly, the compressive stress is also dispersed in a wide range of the arc-shaped cutting edge part 5*a* as shown in FIG. 16. That is, since the work material is gradually cut from the major cutting edge most protruding point S1 to the major cutting edge curvature change point Q1, the stress concentration can be avoided and the strength of the major cutting edge 5 can be improved.

Further, FIGS. 12A and 13A show that the chip 91*a* is greatly twisted. On the other hand, FIG. 14A of this embodiment shows that the twist of the chip 91*a* is smaller than that of the conventional example. The chip 91*a* is formed along the arc-shaped cutting edge part 5*a*. That is, it is possible to form the chip 91*a* with a small twist by providing the major cutting edge curvature change point Q1 between the major cutting edge most protruding point S1 and the cutting edge tip 2*b*.

As shown in FIG. 10, the angle θ1 to the major cutting edge most protruding point S1 of the first cutting insert 1A with respect to the axis O is the same as the angle θ3 to the minor cutting edge most protruding point S2 of the second cutting insert 1B with respect to the axis O while the cutting insert 1 (1A and 1B) of this embodiment is attached to each insert attachment seat 12 (12A and 12B) formed at the tip part of the tool body 11 shown in FIG. 1. Therefore, in this embodiment, the angle θ3 is set to 45° as in the angle θ1.

Since the cutting insert 1 (1A and 1B) of this embodiment has an asymmetrical shape between the major cutting edge 5 and the minor cutting edge 6, the first insert attachment seat 12A of two insert attachment seats 12A and 12B is formed to cut the tip part of the tool body 11 to a range including the axis O on the tip side along with this shape. On the other hand, the second insert attachment seat 12B is formed on the tip side of the tool body 11 at a position slightly away from the axis O to the outer peripheral side as shown in FIG. 1.

As shown in FIG. 1, the first cutting insert 1A and the second cutting insert 1B are respectively attached to the first insert attachment seat 12A or the second insert attachment seat 12B by a clamp screw 9 inserted through each attachment hole 7 (FIG. 10).

The first cutting insert 1A is configured such that the arc-shaped cutting edge part 5*a* of the major cutting edge 5 extends from the vicinity of the axis O and forms a convex hemisphere centered on the axis O with respect to the first insert attachment seat 12A. Further, the first cutting insert 1A is attached such that the linear cutting edge part 5*b* of the major cutting edge 5 is located on a cylindrical face centered on the axis O in contact with the convex hemisphere.

The second cutting insert 1B is attached to the second insert attachment seat 12B such that the arc-shaped cutting edge part 6*a* of the minor cutting edge 6 is located on the convex hemisphere in which the arc-shaped cutting edge part 5*a* of the major cutting edge 5 of the first cutting insert 1A is located from a position away from the axis O. Further, the second cutting insert 1B is attached such that the linear cutting edge part 6*b* of the minor cutting edge 6 is located on the cylindrical face in which the linear cutting edge part 5*b* of the major cutting edge 5 of the first cutting insert 1A is located.

In this way, when the diameter of the tool body 11 while each of the first cutting insert 1A and the second cutting insert 1B is attached to the tool body 11 is D as shown in FIG. 10 and the distance from the cutting edge tip 2*b* to the major cutting edge curvature change point Q1 in the major cutting edge 5 in the direction along the axis O is H, a relationship of $D/30 \leq H \leq D/10$ is satisfied and, for example, $H \geq D/20$ is preferable.

In the direction along the axis O, the lower limit position of the major cutting edge curvature change point Q1 and the upper limit position of the major cutting edge most protruding point S1 are related to the maximum cutting depth (the maximum cutting depth amount). Further, in general, the maximum cutting depth increases as the tool diameter D increases. For example, even if there are a plurality of arcs with different curvatures between the major cutting edge curvature change point Q1 and the cutting edge tip 2*b* when the tool diameter D is 30 mm, a part in which the maximum cutting depth is equal to or smaller than 1.0 mm does not become the major cutting edge curvature change point Q1 of this embodiment. That is, in the direction along the axis O, the distance H from the cutting edge tip 2*b* to the major cutting edge curvature change point Q1 (the lower limit position of the major cutting edge curvature change point Q1) is preferably equal to or larger than 1.0 mm when the tool diameter D is 30 mm.

For example, when the tool diameter D is 30 mm, the distance H from the cutting edge tip 2*b* to the major cutting edge curvature change point Q1 is smaller than the maximum cutting depth 3.0 mm. Specifically, in this embodiment, the distance H from the cutting edge tip 2*b* to the major cutting edge curvature change point Q1 is about 1.4 mm.

Further, in the direction along the axis O, the upper limit position of the major cutting edge most protruding point S1 is preferably equal to or larger than the maximum cutting depth. When the tool diameter D is 30 mm, the distance H1 from the cutting edge tip 2*b* to the major cutting edge most protruding point S1 is larger than the maximum cutting depth 3.0 mm. Specifically, in this embodiment, the distance H1 from the cutting edge tip 2*b* to the major cutting edge most protruding point S1 is about 4.6 mm.

Since the arc-shaped cutting edge part 5*a* in the major cutting edge 5 is formed in a shape in which the distance H1 from the cutting edge tip 2*b* to the major cutting edge most protruding point S1 is larger than the maximum cutting depth, the work material is gradually cut from the major cutting edge most protruding point S1 to the major cutting edge curvature change point Q1, stress concentration can be avoided, cutting resistance can be simultaneously reduced, and the strength of the major cutting edge 5 can be improved.

In the case of the shape in which the distance H1 from the cutting edge tip 2*b* to the major cutting edge most protruding point S1 is smaller than the maximum cutting depth, since the work material is first cut from the major cutting edge most protruding point S1, cutting stress tends to concentrate at the major cutting edge most protruding point S1 and cracks tend to occur on the tool rear end side of the major cutting edge most protruding point S1. Therefore, it is preferable to have a shape in which the distance H1 from the cutting edge tip 2*b* to the major cutting edge most protruding point S1 is larger than the maximum cutting depth.

As described above, in this embodiment, the arc-shaped cutting edge part 5*a* of the major cutting edge 5 or the arc-shaped cutting edge part 6*a* of the minor cutting edge 6 is formed in a convex curved shape moving away from the seating face 3 and moving close to the seating face 3 again as it moves away the linear cutting edge parts 5*b* and 6*b* and the curvature change points Q1 and Q2 are provided between the most protruding points S1 and S2 that protrude most with respect to the seating face 3 in the arc-shaped cutting edge parts 5*a* and 6*a* and the cutting edge tips 2*b* and 2*a*. Since the curvature change points Q1 and Q2 are provided as well as the most protruding points S1 and S2, the arc-shaped cutting edge parts 5*a* and 6*a* gradually bite and cut the work material from the most protruding points S1 and S2 which protrude most with respect to the seating face 3 to the curvature change points Q1 and Q2 during cutting. Accordingly, stress during cutting can be dispersed in a wider range including the curvature change points Q1 and Q2 from the most protruding points S1 and S2.

In this way, since it is possible to ensure the thickness of the cutting insert 1 to improve the strength by providing the most protruding points S1 and S2 and to reduce the cutting resistance by providing the curvature change points Q1 and Q2 between the most protruding points S1 and S2 and the cutting edge tips 2*b* and 2*a*, it is possible to prevent the cutting insert 1 from being damaged by a load during cutting.

Further, chips are generated during cutting, but in the case of a conventional shape in which there is no curvature change point Q between the most protruding point S and the cutting edge tip 2*b* in the arc-shaped cutting edge part 5*a*, chips are bent and pulled.

On the other hand, in this embodiment, since the curvature change point Q exists between the most protruding point S and the cutting edge tip 2*b*, chips generated by cutting are less likely to bend and stress during cutting is dispersed. Accordingly, since the discharge of chips is improved, it is possible to prevent the arc-shaped cutting edge part 5*a* from being chipped or damaged (cracked). As a result, it is possible to extend the life of the cutting insert 1.

Further, as shown in FIG. 3, since the most protruding points S1 and S2 and the curvature change points Q1 and Q2 are arranged at positions that do not overlap the opening of the groove part 8 to the flank face 4, it is possible to sufficiently ensure a thick part from the seating face 3 to the most protruding points S1 and S2 and the curvature change points Q1 and Q2 and to prevent the major cutting edge 5 and the minor cutting edge 6 from being damaged even when the cutting insert 1 is affected by a large amount of impediment to cutting.

In this way, the cutting insert 1 of this embodiment can suppress the occurrence of cracks on the cutting edge part by dispersing the stress during cutting at a wider cutting depth than before and increasing the strength on the cutting edge tip side.

Although the preferred embodiments according to the present invention have been described above with reference to the accompanying drawings, the present invention is not limited to such examples. A person skilled in the art can conceive of various modifications or corrections within the scope of the technical idea described in the claims. These also belong to the technical scope of the present invention. The configurations of the above-described embodiments may be appropriately combined.

Further, the cutting insert according to the present invention is preferably made of cemented carbide with tungsten carbide-cobalt base (WC—Co base) as the main raw material, but in addition to cemented carbide containing carbonitride-based cermets other than tungsten carbide-cobalt base, high-speed steel, titanium carbide, silicon carbide, silicon nitride, aluminum nitride, aluminum oxide, ceramics made of mixtures thereof, cubic boron nitride sintered bodies, diamond sintered bodies, ultra-high pressure sintered bodies obtained by sintering a hard phase made of polycrystalline diamond or cubic boron nitride and a bonding phase such as ceramics or iron group metals under an ultra-high pressure, and the like can also be used.

Additionally, in the cutting insert of the above-described embodiment, the arc-shaped cutting edge parts (5*a* and 6*a*) may be composed of first cutting edges (51 and 61) and second cutting edges (52 and 62) to N-th cutting edges (N is an integer of 2 or more, N=2 in the above-described embodiment) each having an arc shape and having at least two or more different arc radii in order from the position corresponding to the tool tip side. Further, in the first cutting edges (51 and 61) on the tip side, the arc radius may be smaller than those of the second cutting edges (52 and 62) to N-th cutting edges and in the first cutting edge (51 and 61), a cutting edge angle which is an angle formed by the flank face (4) and the rake face (2) may be gradually decreased from the second cutting edge (52 and 62) toward the tool tip side.

In this case, in the first cutting edges (51 and 61) of the arc-shaped cutting edge parts (5*a* and 6*a*), since the cutting edge angle of the cutting edge part is gradually decreased from the second cutting edge (52 and 62) toward the tip part, the flank angle of the cutting edge during cutting by the cutting edge tip part can be increased and the progress of the wear of the flank face of the cutting edge tip part can be suppressed.

Additionally, in general, the tip part of the arc-shaped cutting edge part is subject to thrust force from the Z-axis direction during cutting, and there is a high risk of chipping. Further, in general, the thickness increases as the cutting edge angle increases to increase the strength of the cutting edge, but if the flank angle is small when cutting a work material such as high-hardness steel, the tool life may vary even if the thickness is large. On the other hand, in the above-described configuration, the life of the tip part of the arc-shaped cutting edge part can be stabilized by gradually decreasing the flank angle of the cutting edge tip part from the rear end side to the tip side of the first cutting edges (51 and 61) and ensuring a certain flank angle at the tip part of the arc-shaped cutting edge part during cutting. The flank angles of the first cutting edges (51 and 61) are preferably about 10 to 25° on the tool tip side and about 5 to 20° on the side of the second cutting edge (52 and 62) and the difference between them is preferably about 5 to 15°. More preferably, the cutting edge angles of the first cutting edges (51 and 61) are about 15 to 25° on the tool tip side and about 8 to 18° on the side of the second cutting edge (52 and 62) and the difference between them is about 10 to 15°.

Further, in the above-described embodiment, the difference H3 between the lowest point of the cutting insert 1A and the lowest point of the other cutting insert 1B is related to the diameter D of the tool body 11 and H3/D may be 0.025 or less. In this case, since H3/D is set to 0.025 or less, it is possible to sufficiently decrease the cutting edge step of the cutting insert with respect to the tool diameter D. As a result, since the cutting range only by the cutting insert 1A (that is, the parent cutting edge) having the lower lowest point decreases, the wear at the tip part of the cutting insert 1A having the lower lowest point is suppressed and the life of the cutting insert 1A can be extended. H3/D is preferably 0.020 or less and more preferably 0.017 or less. Although the lower limit of H3/D is not limited, the lower limit is realistically about 0.010.

INDUSTRIAL APPLICABILITY

According to the cutting insert and the cutting-edge-replaceable cutting tool of the present invention, since it is possible to suppress occurrence of cracks on the cutting edge part by dispersing the stress generated in the arc-shaped cutting edge part, the present invention is industrially applicable.

REFERENCE SIGNS LIST

1 Cutting insert
2 Rake face
2*a*, 2*b* Cutting edge tip
3 Seating face
4 Flank face
5 Major cutting edge (cutting edge)
5*a*, 6*a* Arc-shaped cutting edge part
5*b*, 6*b* Linear cutting edge part
6 Minor cutting edge (cutting edge)
7 Attachment hole
8 (8A, 8B) Groove part
11 Tool body
12, 12A Insert attachment seat
12*a* Bottom face
17 Convex curved part
21 Breaker
21*a* Vertex (ridge line)
51, 61 First cutting edge
52, 62 Second cutting edge
100 Cutting-edge-replaceable ball end mill (cutting-edge-replaceable cutting tool)
H, H1, H3 Distance
L1, L2 Line
N1, N2 Tangent line
O Axis
P Center point
Q (Q1, Q2) Curvature change point
R1, R2 Arc radius
S (S1, S2) Most protruding point
T Rotation direction of end mill body
T1 Height (thickness) from seating face in range from cutting edge tip to curvature change point
T2 Height (thickness) from seating face in range from curvature change point to most protruding point
θ1, θ2, θ3 Angle

The invention claimed is:

1. A cutting insert detachably attached to an insert attachment seat formed at a tip of a tool body in a cutting-edge-replaceable cutting tool rotating around an axis, comprising:

a rake face which faces a rotation direction of the tool body;

a seating face which is seated on a bottom face of the insert attachment seat to face the side opposite to the rake face; and a flank face which extends around the rake face and the seating face, wherein two cutting edges each including an arc-shaped cutting edge part extending in an arc shape in a plan view when viewed from a direction facing the rake face and a linear cutting edge part extending to be in contact with the arc-shaped cutting edge part are formed at an intersection ridge line part between the rake face and the flank face so that the arc-shaped cutting edge part and the linear cutting edge part are located alternately in a circumferential direction of the rake face, wherein each of the cutting edges includes a convex curved part moving away from the seating face and then moving close to the seating face as the arc-shaped cutting edge part moves away from the linear cutting edge part, and a most protruding point that is a point farthest from the seating face on the convex curved part, in a side view when viewed from a normal direction with respect to a tangent line of the arc-shaped cutting edge part passing through the most protruding point, the arc-shaped cutting edge part includes a curvature change point between a cutting edge tip of the arc-shaped cutting edge part and the most protruding point, wherein in the side view, the cutting edge has a first cutting edge having a curved shape in which a cutting edge tip side protrudes upward with respect to the seating face and a second cutting edge having a shape in which a most protruding point side protrudes upward with respect to the seating face with the curvature change point as a boundary, wherein the second cutting edge is formed as a second cutting edge having a curved or linear shape with a curvature smaller than that of the first cutting edge, wherein an intersection between the first cutting edge and the second cutting edge is the curvature change point, and wherein the curvature of the first cutting edge is twice or more the curvature of the second cutting edge.

2. The cutting insert according to claim 1, wherein in the side view when viewed from a normal direction with respect to a tangent line of the arc-shaped cutting edge part passing through the most protruding point, each of the cutting edges includes arcs having at least two different curvatures, and wherein when an arc radius on the cutting edge tip side is R1 and an arc radius on the most protruding point side is R2, a relationship of R1<R2 is satisfied.

3. The cutting insert according to claim 2, wherein the arc radius R1 is ½ or less of the arc radius R2.

4. The cutting insert according to claim 1, wherein the second cutting edge is a part in which a ratio of a height from the cutting edge tip to an arbitrary cutting edge ridge line with respect to a height from the cutting edge tip to the most protruding point in a direction perpendicular to the seating face at the arc-shaped cutting edge part in the side view is 90% or more.

5. The cutting insert according to claim 1, wherein the cutting insert is provided with a groove part having a wall face capable of abutting against a convex part protruding from the bottom face of the insert attachment seat, wherein two groove parts are formed with an attachment hole for attaching the cutting insert in a sandwiched state, and wherein the curvature change point is formed on the cutting edge tip side in relation to one groove part close to the arc-shaped cutting edge part in the two groove parts.

6. The cutting insert according to claim 1, wherein the arc-shaped cutting edge part is composed of a first cutting edge and a second cutting edge to an N-th cutting edge, in which N is an integer of 2 or more, each having an arc shape and having at least two or more different arc radii in order from a position corresponding to a tool tip side, wherein the first cutting edge on the tip side has an arc radius smaller than those of the second cutting edge to the N-th cutting edge, and wherein in the first cutting edge, a cutting edge angle which is an angle formed by the flank face and the rake face decreases from the second cutting edge side toward the tool tip side.

7. A cutting-edge-replaceable cutting tool comprising:

the cutting insert according to claim 1; and a tool body to which a plurality of the cutting inserts are attachable, wherein when a center point of the arc-shaped cutting edge part located on the axis of the tool body is defined as P, an angle formed by the axis and a line connecting the center point P and the most protruding point is $\theta\mathbf{1}$, and an angle formed by the axis and a line connecting the center point and the curvature change point is $\theta\mathbf{2}$, $\theta 2<\theta 1$, $30°\leq\theta|\leq 50°$, and $15°\leq\theta 2\leq 40°$ are satisfied.

8. The cutting-edge-replaceable cutting tool according to claim 7, wherein when a distance from the cutting edge tip of the cutting edge of the cutting insert to the curvature change point is H in a direction along the axis and a diameter of the tool body is D, a relationship of $D/30\leq H\leq D/10$ is satisfied.

9. The cutting-edge-replaceable cutting tool according to claim 8, wherein when a difference between the lowest points of any one cutting insert and the other cutting insert is H while a plurality of the cutting inserts are attached to the tool body, a relationship with the diameter D of the tool body is set such that H/D is 0.025 or less.

10. The cutting-edge-replaceable cutting tool according to claim 7, wherein while the cutting insert is attached to the tool body, the arc-shaped cutting edge part is composed of a first cutting edge and a second cutting edge to an N-th cutting edge, in which N is an integer of 2 or more, each having an arc shape and having at least two or more different arc radii in order from a position corresponding to a tool tip side, wherein the first cutting edge on the tip side has an arc radius smaller than those of the second cutting edge to the N-th cutting edge, and wherein in the first cutting edge, a flank angle which is an angle formed by a work material face and the flank face of the cutting insert gradually increases from the second cutting edge side toward the tool tip side.

11. The cutting-edge-replaceable cutting tool according to claim 7, wherein two insert attachment seats are formed at positions separated from each other by 180° at a tip part of the tool body, and wherein the cutting insert is detachably attached to each of these two insert attachment seats.

* * * * *